United States Patent
Agrawal et al.

(10) Patent No.: US 8,145,909 B1
(45) Date of Patent: Mar. 27, 2012

(54) DIGITALLY SIGNING AN ELECTRONIC DOCUMENT USING SEED DATA

(75) Inventors: Sunil Agrawal, Milpitas, CA (US);
Andrei Sheretov, Campbell, CA (US);
John Landwehr, San Mateo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1098 days.

(21) Appl. No.: 11/804,069

(22) Filed: May 16, 2007

(51) Int. Cl.
*H04L 9/00* (2006.01)
*H04L 9/32* (2006.01)
*G06F 7/04* (2006.01)

(52) U.S. Cl. ........ 713/176; 713/177; 713/178; 713/179; 713/180; 713/181; 726/27; 726/28; 726/29; 726/30

(58) Field of Classification Search .................... 713/176
See application file for complete search history.

(56) References Cited

U.S. PATENT DOCUMENTS

| | | | |
|---|---|---|---|
| 2004/0225709 A1* | 11/2004 | Kubler et al. | 709/200 |
| 2005/0044197 A1* | 2/2005 | Lai | 709/223 |
| 2005/0114670 A1* | 5/2005 | Bowe et al. | 713/180 |
| 2008/0120504 A1* | 5/2008 | Kirkup et al. | 713/176 |

* cited by examiner

*Primary Examiner* — Longbit Chai
(74) *Attorney, Agent, or Firm* — Schwegman, Lundberg & Woessner, P.A.

(57) ABSTRACT

In one example embodiment, a method is illustrated that includes parsing seed data from digital content, the seed data identifying a signing entity, transmitting identifier data to the signing entity identified by the seed data, transmitting content information relating to the digital content to the signing entity, and receiving digitally signed content information relating to the digital content, the digitally signed content information signed by the signing entity. In another example embodiment, a method is illustrated as including parsing seed data from digital content, the seed data identifying a signing entity, transmitting identifier data to the signing entity identified by the seed data, receiving a credential from the signing entity, the credential used to sign the digital content, and signing the digital content using the credential.

38 Claims, 17 Drawing Sheets

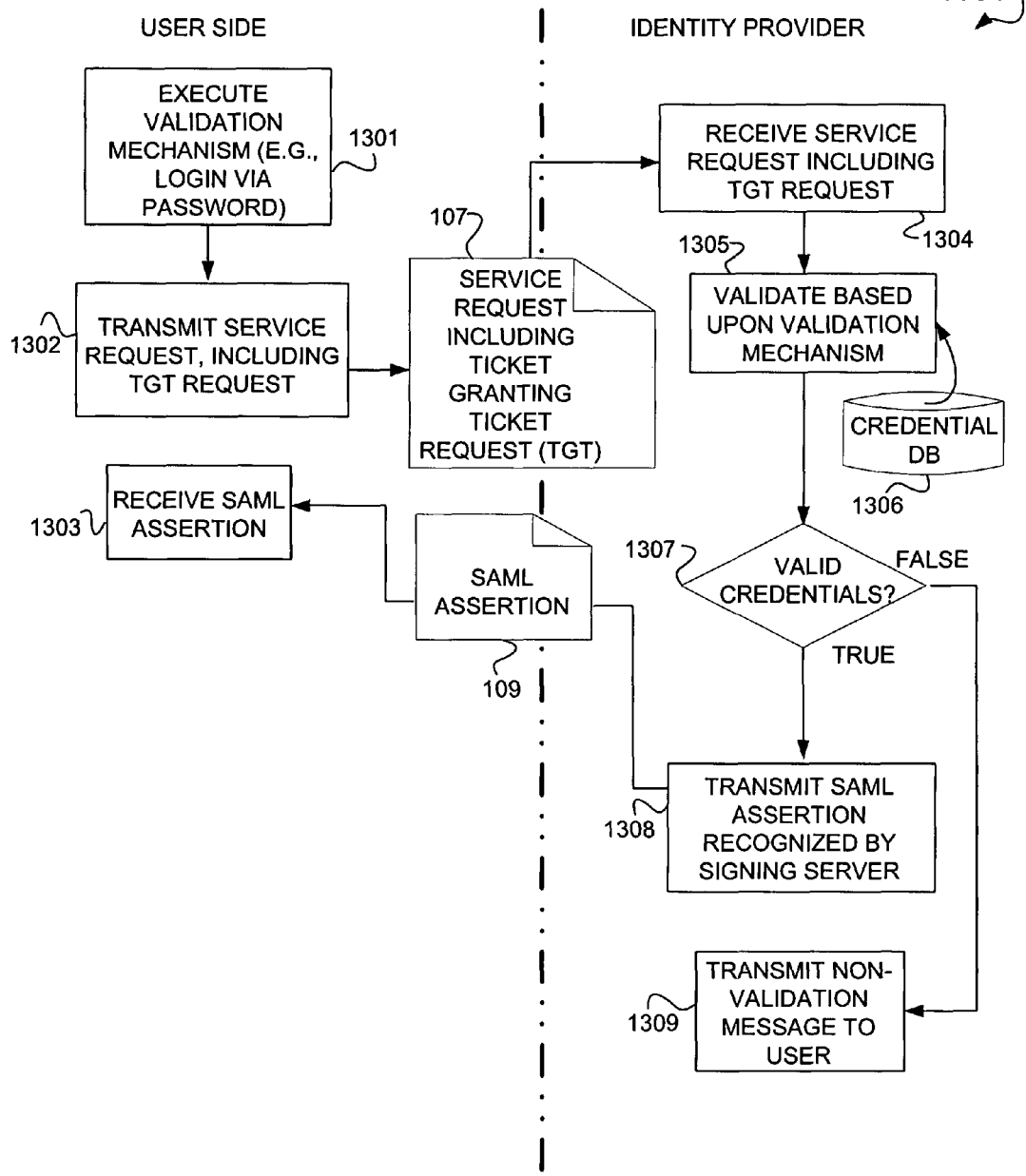

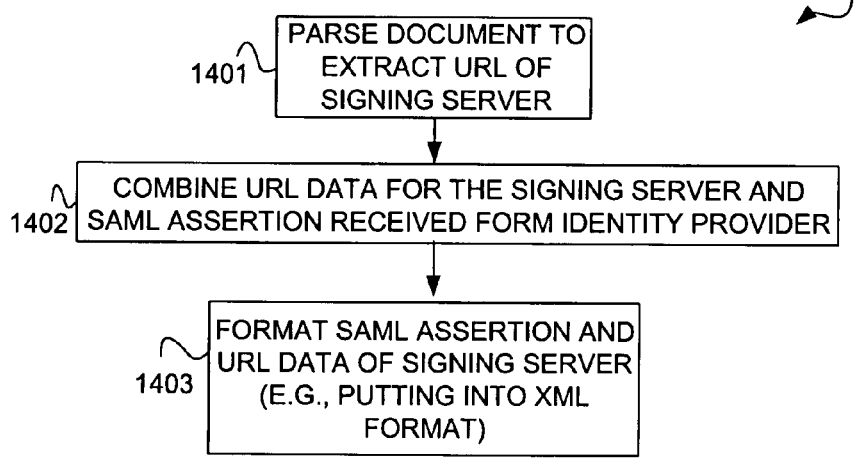
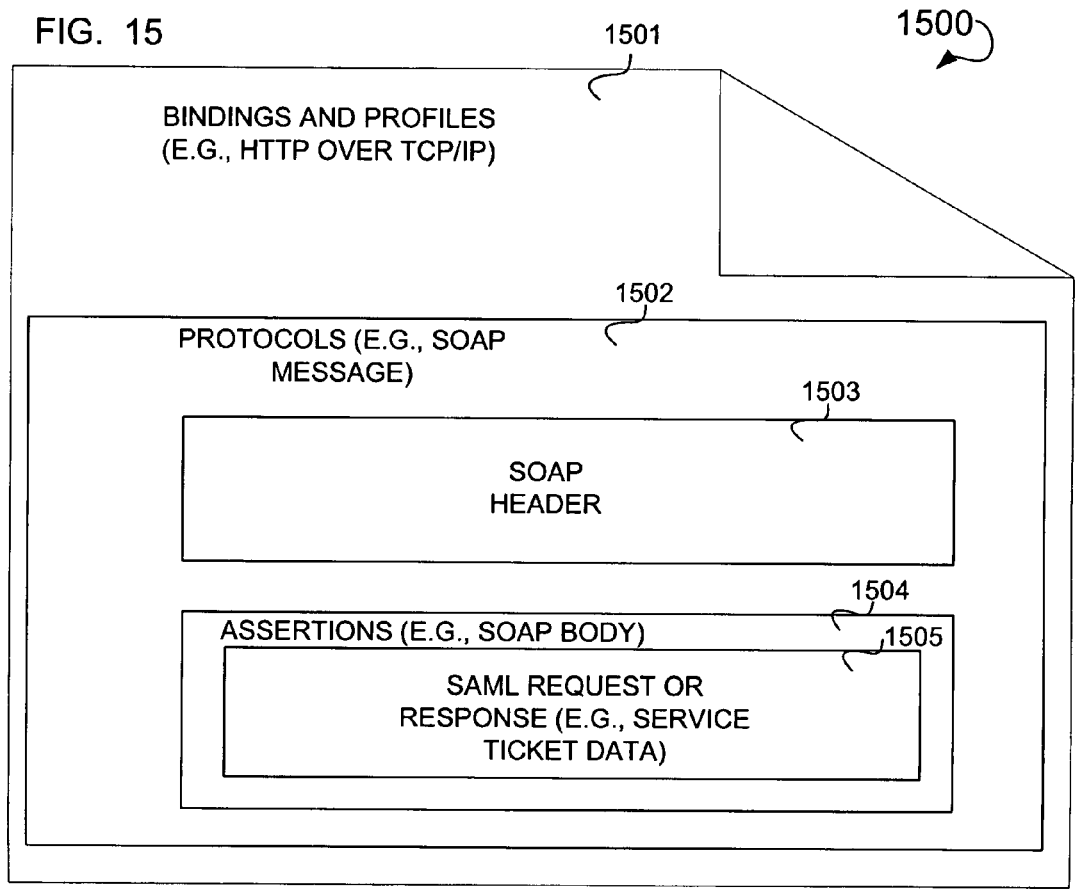

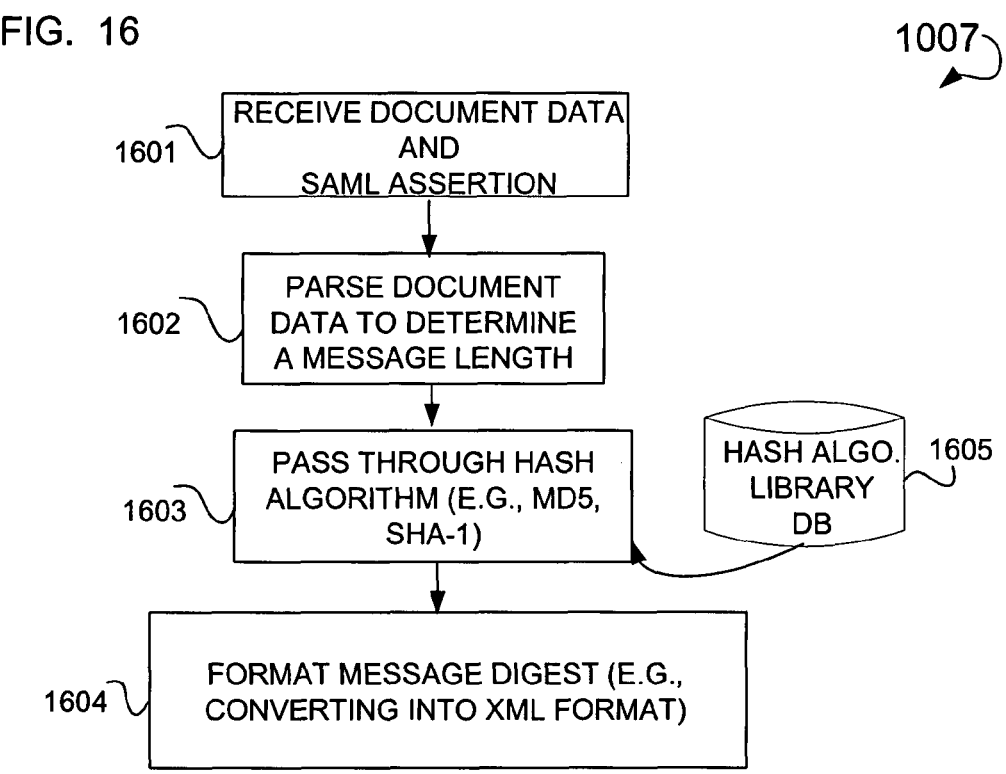

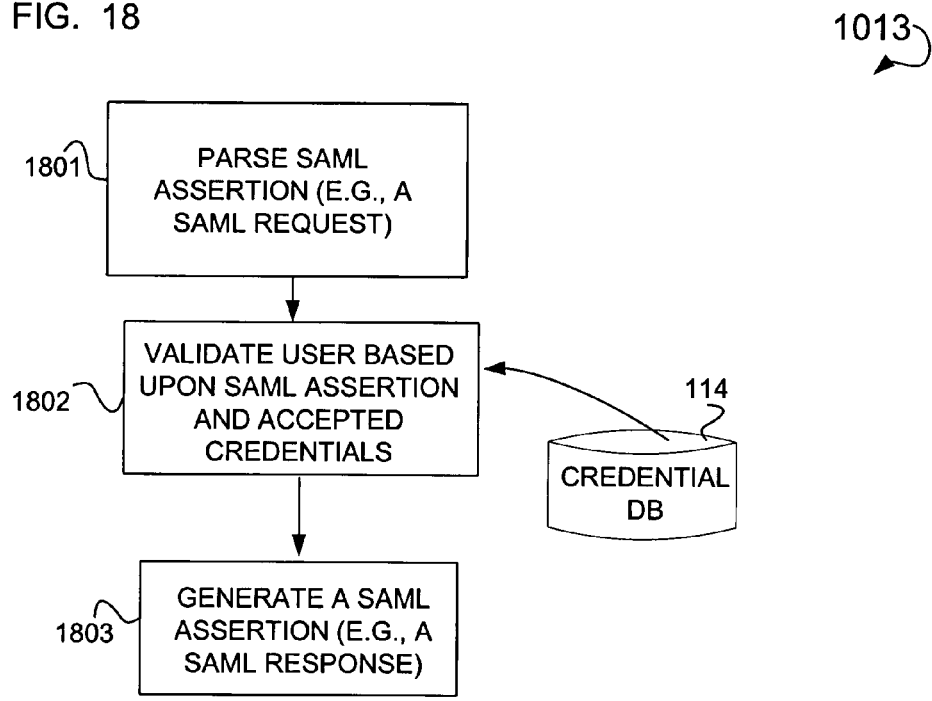
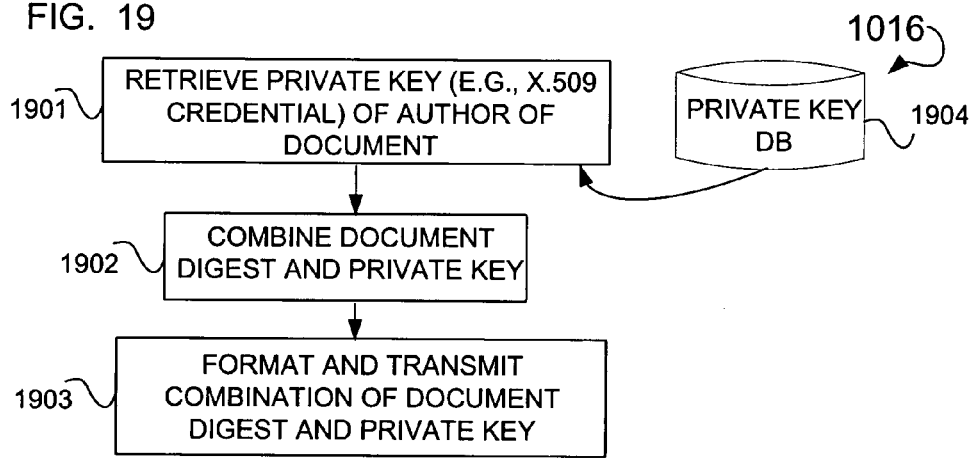

DIGITALLY SIGNING AN ELECTRONIC DOCUMENT USING SEED DATA

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2007, Adobe Systems Incorporated. All Rights Reserved.

TECHNICAL FIELD

The present application relates generally to the technical field of algorithms and programming and, in one specific example, to the digital signing of an electronic document.

BACKGROUND

Digital signatures are used to verify the identity of a party who signs a document. These signatures may be used to uniquely identify, for example, an author of a document, or, in some cases, a signing party who may or may not be an author. These digital signatures may or may not involve a certificate containing a symmetric or asymmetric key, and/or information relating to the identity of the signing party.

BRIEF DESCRIPTION OF THE DRAWINGS

Some embodiments are illustrated by way of example and not limitation in the figures of the accompanying drawings in which:

FIG. 13 is a dual-stream flow chart illustrating an operation that receives or generates a document that needs to be signed by a signing server, according to an example embodiment.

FIG. 14 is a flow chart illustrating an operation that generates an authentication request for a signing server, according to an example embodiment.

FIG. 15 is a diagram of a data packet that may be used to transmit a Security Assertion Mark-up Language (SAML) assertion and URL data, according to an example embodiment.

FIG. 16 is a flowchart illustrating an operation that transmits a document signing request from the user side, according to an example embodiment.

FIG. 18 is a flowchart illustrating an operation that transmits a SAML assertion from the signing server side to the user side, according to an example embodiment.

FIG. 19 is a flowchart illustrating an operation that transmits a received digest along with some type of credential, according to an example embodiment.

DETAILED DESCRIPTION

Figure 1:
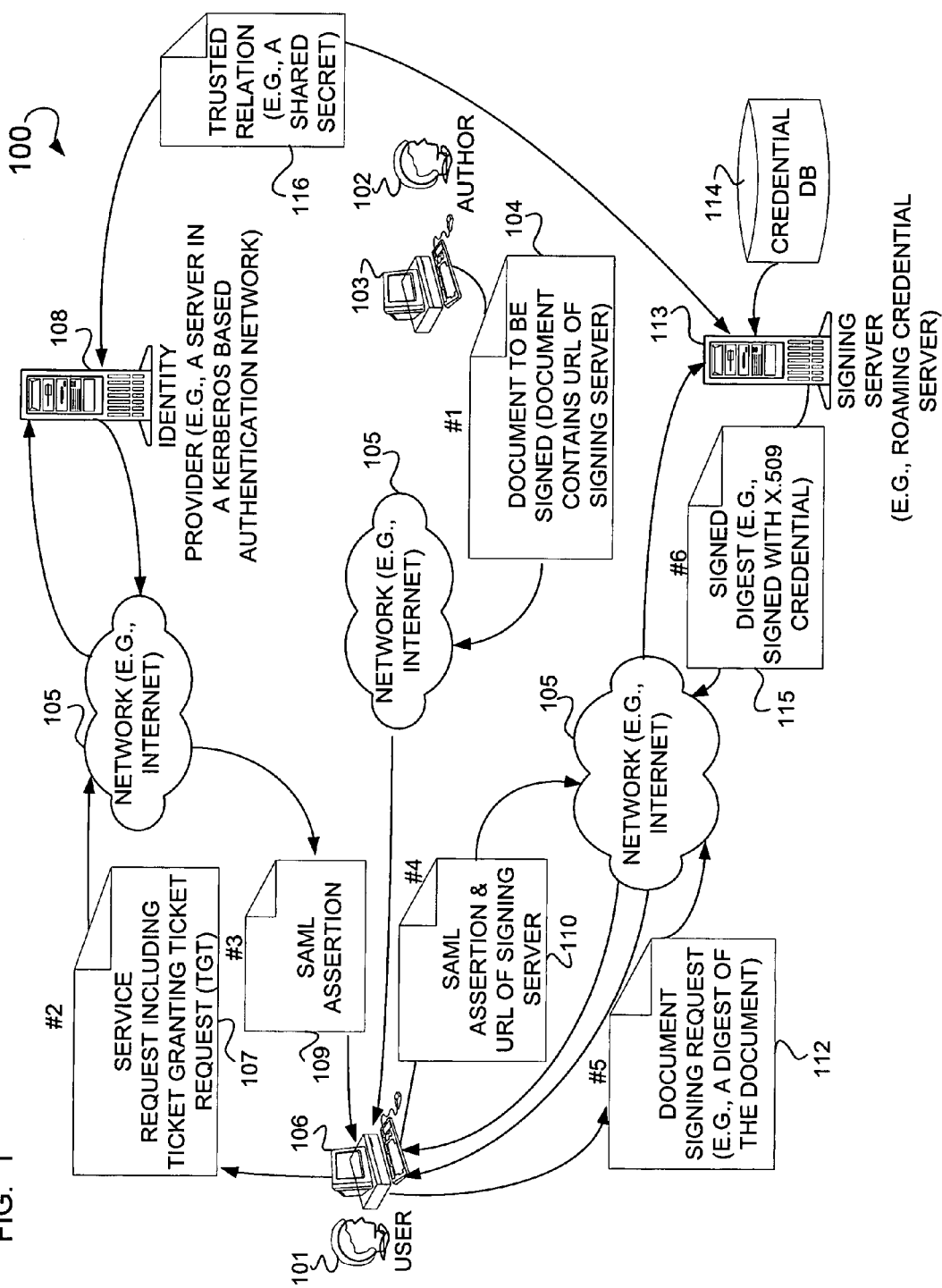
FIG. 1 is a diagram of a system used to facilitate the one-click signing of documents wherein the signing server acts as a signing proxy for an author, according to an example embodiment.

In the following description, for purposes of explanation, numerous specific details are set forth in order to provide a thorough understanding of an embodiment of the present invention. It may be evident, however, to one skilled in the art that the present invention will be practiced without these specific details.

The leading digit(s) of reference numbers appearing in the figures generally corresponds to the figure number in which that component is first introduced, such that the same reference number is used throughout to refer to an identical component which appears in multiple figures. Signals and connections may be referred to by the same reference number or label, and the actual meaning will be clear from its use in the context of the description.

In some embodiments, a single action is used to digitally sign a piece of digital content such as an electronic document. This electronic document may be formatted using a Portable Document Format (PDF), eXtensible Markup Language (XML) Forms Architecture (XFA) format, a Tagged Image File Format (TIFF), or some other suitable format. In one embodiment, this single action is a mouse click, wherein a user clicks on a displayed area of an electronic document where the user intends to sign the electronic document. Further, this single action may include at least one of a sound, a selection using a television remote control, a selection of a key on a keypad, a selection using a pointing device, or a selection of a displayed indication. This displayed indication may include a displayed area of a document containing an indication (e.g., the phrase "sign here") as to where to sign the electronic document. This mouse click may be performed using some type of input device such as a mouse, or similar input devices such as a light pen, or via some other suitable input device. Once this single action is executed, certain types of visible and invisible data are associated with the electronic document. The visible data may include, for example, the name of the user, the date and time of the signature, and/or other identifying information. The invisible information may be, for example, a digital key such as a symmetric or asymmetric key used to verify the identity of the signing party. In some cases, additional metadata (e.g., XML formatted data) may be associated with the electronic document prior to or contemporaneously with the signing of the document. This metadata may include location data illustrating the location of a signing server (e.g., a Uniform Resource Locator (URL), an Internet Protocol (IP) address, a Media Access Control (MAC) address, or some other identifying value). This location data may be considered as seed data. Through the use of location data, the signing server may be thought of as a roaming credential server not limited to use by authors of a particular geographical location.

Some embodiments may include the use of a Public Key Infrastructure (PKI) model and various associated technologies such as kerberos, and SAML to facilitate the digital signing of the electronic document. The use of kerberos and SAML facilitate the use of Single Sign On (SSO) authentication within the context of digital signatures, and more specifically the one-click signing of an electronic document. Other types of SSO technology that may be employed may include Java Open Single Sign-On (JOSSO), Web Single Sign-On (Web-SSO), Enterprise Single Sign-On (E-SSO), or some other suitable SSO authentication method and/or system. In one embodiment, a user may authenticate themselves to an identity provider (e.g., a server is a kerberos-based network) using some type of verification mechanism. In certain cases, the user may be the author of the electronic document to be signed. In other cases, the user and author are distinct persons. Moreover, in certain cases, the identity provider may be a third-party server (e.g., an identity server run by VERISIGN, INC.™ of Mountain View, Calif.).

The verification mechanism used to authenticate a party signing an electronic document may include the user identification and password for the particular user. This user identification and password may be supplied by, for example, a user at login, wherein the user logs into their own computer system, and the user's identity is verified using kerberos in conjunction with the identity provider. Once the user's identity is verified, the user is free to make a service request of the identity provider to receive services so as, for example, to facilitate the digital signing of an electronic document. For example, the user may make a request for and receive a SAML assertion (e.g., XML formatted data that identifies the user) from the identity provider that can be used to receive a credential from a signing server. This credential may contain a symmetric or asymmetric key to be used to digitally sign the document. In certain cases, the credential may observe the X.509 standard, and use a private key (e.g., the private key of the public key/private key pair in the case of asymmetric key encryption) to digitally sign an electronic document. Once signed, the validity of the digital signature may be determined by a public key held by a verifying party (e.g., a party who seeks to verify the digital signature).

Example embodiments may include the use of an open PGP model in lieu of a PKI model for verifying the identity of the signing party and obtaining a credential for signing. As will be more fully illustrated below, in an open PGP model (e.g., open PGP system), multiple authenticating member servers are organized into a ring of trust, wherein each of these authenticating member servers performs the roles of both identity provider and signing server. In cases where an open PGP system is employed, the author of an electronic document may set the number of authenticating members required to authenticate a user's (e.g., a signing party) identity. Further, the author of an electronic document may be free to choose a particular authenticating member server to identify a user. In cases where a user is successfully identified, the user may receive a symmetric or asymmetric key with which to digitally sign an electronic document. This symmetric or asymmetric key may be provider to the user as part of a certificate containing other information needed for digital signing.

Some embodiments may include a user logging onto an operating system such as MICROSOFT WINDOWS™ or LINUX™ and the GUI (e.g., a desktop) associated therewith using a user identification and password. This login may be kerberos-based, and hence logging in results in a kerberos TGT being generated as a single sign-on token. Then, a user receives a PDF that needs to be signed using a signing server. This signing server may specify a seed value or other verifying value for the signature. Next, a user may initiate a single action (e.g., a single mouse click) on a signature field displayed on the document. When this single action is executed, the specific signing server is identified through its URL value (e.g., the seed data). In some embodiments, the user does not need to select the appropriate credential, since it is automatically selected for them. Moreover, in some embodiments, the user sees a signing dialog asking for confirmation. In other embodiments, the user does not see this signing dialog.

Once the user engages (e.g., executes) in this single action, a number of additional operations are automatically executed by the user's computer system. A signing server is automatically contacted through the use of the seed value (e.g., the URL). The signing server asks for authentication of the user's computer system, with a kerberos TGT being one of the acceptable forms of authentication. Next, using the TGT, the user's computer system automatically makes a service request of the identity provider to receive a SAML assertion for use with the signing server. In response, the identity provider provides a SAML assertion to be used by the computer system of the user who seeks to authenticate themselves to the signing server. This SAML assertion is then automatically provided to the signing server without prompting the user for any information. In response, the signing server automatically looks at the SAML assertion, and then checks its database of credentials for a credential for the particular user. If the signing server detects it doesn't have any credential for the user, it may contact an active directory server (e.g., or any other Lightweight Directory Access Protocol (LDAP) based server). From this active directory server, it fetches the relevant information (e.g. user name, department, name of the company, and/or location). In certain cases, the signing server will return a message to the computer system of the user verifying the user's identity based upon the SAML assertion. After the user's identity is verified the signing server may provide one or services to the user. The signing server may act as a signing proxy and sign a document on behalf of another person such as an author. In such a scenario, the user's computer system automatically asks the signing server to sign the electronic document, or a digest or that document using a private key of a public key/private key pair. Once signed this electronic document or digest of that document is returned to the user. Another service that the signing server may provide is that it may grant the user a credential (e.g., an X.509 credential) to be used by the user to sign (e.g., the user will act as a signing party) an electronic document. This X.509 formatted credential contains a private key of a public key/private key pair, and may be stored by the user for future use.

Example System

Some embodiments may include the use of a signing server to act as a signing proxy for a user or author (e.g., the signing party) such that the signing server signs the electronic document. In other embodiment, an author or user themselves is the signing party who actually digitally signs the electronic document. In either case, the electronic document is signed with a private key or a public key/private key pair.

FIG. 1 is a diagram of an example system 100 used to facilitate the one-click signing of documents wherein the signing server acts as a signing proxy for an author 102. Illustrated is a system 100 utilizing a number of technologies including, for example, a PKI model, the kerberos protocol, and SAML. In some cases, the author 102 utilizing a computer system 103 generates an electronic document 104 to be signed. The electronic document 104 contains not only textual data but also metadata (e.g., including seed data) indicating the Uniform Resource Locator (URL) of a signing server that may be used to digitally sign electronic document 104. The electronic document 104 is transmitted across a network 105 by the computer system 103 to a user 101 using a computer system 106. In some cases, the author 102 and user 101 may be the same person. In others cases, as illustrated here, the author 102 and user 101 may be distinct persons. Once the electronic document 104 is received by the user 101, user 101 generates a service request that includes, among other things, a Ticket-Granting-Ticket (TGT) request. A service request 107 containing the TGT request is then transmitted across the network 105 to an identity provider 108. The identity provider 108 may be, for example, a server in a kerberos-based authentication network. Once the service request 107 is received by the identity provider 108, the identity provider 108 may, in some cases, verify the identity of the user 101 through the user 101's user identification and password. This user identification and password may be furnished contemporaneously with the service request 107, or may be provided before the service request 107 is provided (e.g., at a login time on the computer system 106). Once the user identification and password are verified, the identity provider 108 generates and transmits a SAML assertion 109 across the network 105 to the computer system 106. Once the SAML assertion 109 is received by the user 101, the URL of the signing server may be extracted from metadata associated with the electronic document 104. Next, the URL may be combined with the SAML assertion 109 and transmitted as, for example, an XML data stream or file 110 that may then be transmitted across the network 105 to a signing server 113. Upon being received at the signing server 113, the signing server 113 may verify the identity of the user 101 and, more specifically, may verify the identity of user 101 using the SAML assertion 109 contained in the XML data stream or file 110. This verification may be based upon, in part, a trusted relationship 116 existing between the identity provider 108 and the signing server 113. The trusted relationship 116 may be in the form of, for example, a shared secret or other form of symmetric encryption or symmetric key data.

Once the identity of the user 101 is verified by the signing server 113, an electronic document signing request 112 that contains a digest of the electronic document may be transmitted by the computer system 106 across the network 105 to the signing server 113. Once the identity of the user 101 is again confirmed, a signed digest 115 may be generated. The signed digest 115 may contain, among other things, credential data such as an X.509 credential that contains, among other things, a private key. This X.509 credential, along with the signed digest itself, may be transmitted back across the network 105 to the user 101 to be received at the computer system 106. Once received by the user 101, the signed digest 115 may be checked to determine that the digest in the signed digest 115 corresponds to the digest contained in the document signing request 112. Where the digests correspond, the electronic document 104 may be deemed to be signed by the author 102 through the signing server 113 acting as a signing proxy for the author 102. In some cases, as will be more fully illustrated below, the digest in the document signing request 112 may be generated using some type of hashing function such as Message-Digest algorithm 5 (MD5), or Secure Hash Algorithm (SHA-1).

Example embodiments may include the transmission of an entire electronic document in lieu of a digest of an electronic document such that the entire electronic document and a SAML assertion is transmitted in place of the signing request 112. Further, the entire electronic document may be digitally signed and transmitted in place of the signed digest 115. The specific implementation needs and empirical testing and modeling may be used to determine whether to use digests or complete versions of the electronic document.

Figure 2:
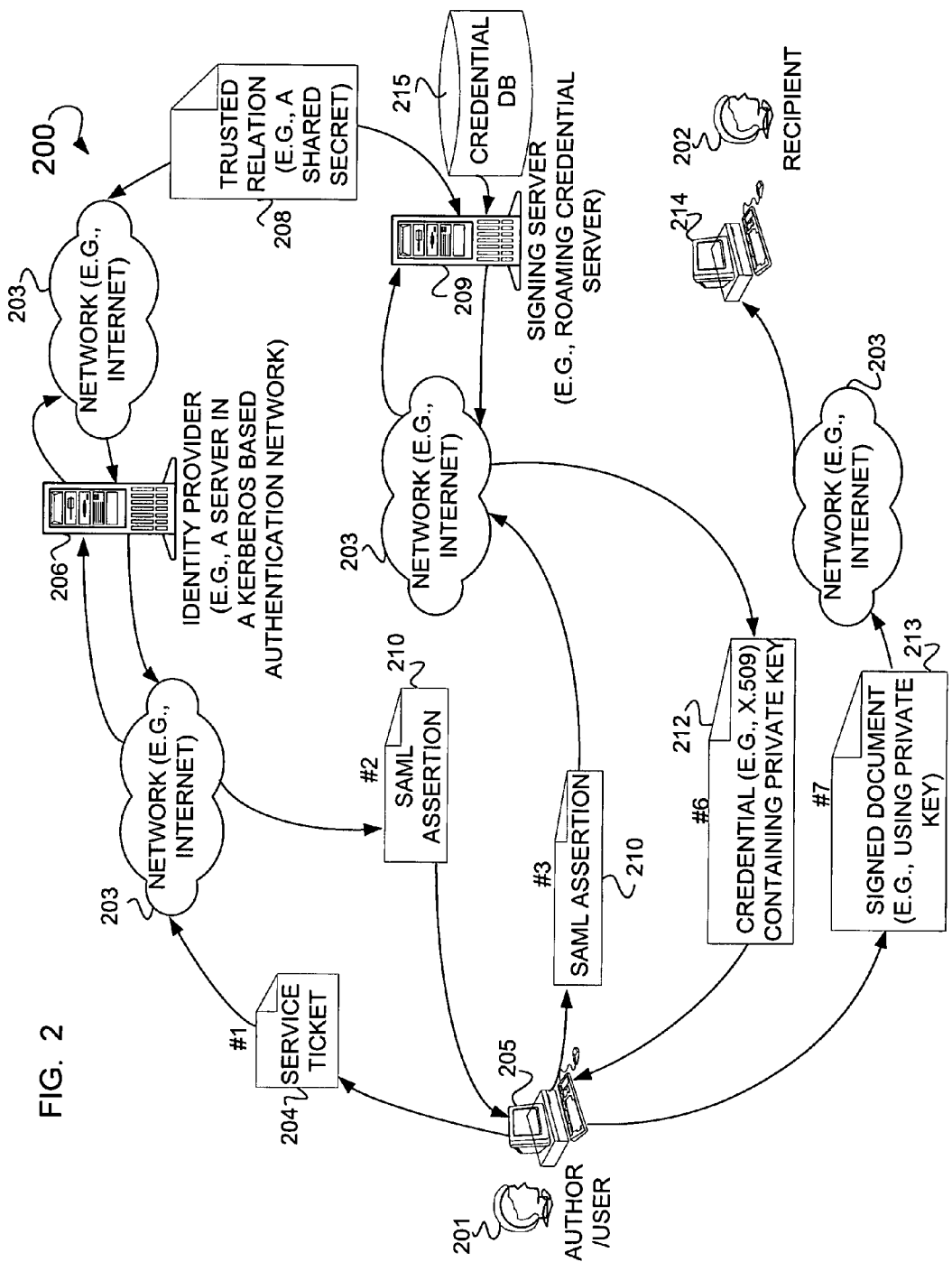
FIG. 2 is a diagram of a system where the author and user are the same person and the author/user is a signing party, according to an example embodiment.

FIG. 2 is a diagram of an example system 200 where the author and user are the same person and the author/user is the signing party. Illustrated is an author/user 201 who, utilizing a computer system 205, generates a service ticket 204. The service ticket 204 is transmitted across a network 203 to an identity provider 206. The identity provider 206 may be, for example, a server in a kerberos-based authentication network. Once the identity of the author/user 201 is verified using, for example, the author/user's 201 user identification and password, a SAML assertion 210 is transmitted back across the network 203 to the author/user 201. A SAML assertion (e.g., SAML assertion 210) may be used as a format to exchange authentication and authorization data between security domains, such as between the identity provider 206 and a signing server 209. In certain cases, this exchange may be made by way of the author/user 201, while in other embodiments, it may be made directly between the identity provider 206 and the signing server 209. The author/user 201 then transmits the SAML assertion 210 back across the network 203 to the signing server 209. Next, the signing server 209 uses a trusted relationship 208 that it has with the identity provider 206 to determine the validity of the SAML assertion 210, or just to verify the identity of the identity provider irrespective of the SAML assertion 210. The trusted relationship 116 may be, for example, a shared secret or other type of symmetric or even symmetric key data.

Once the trusted relationship 208 is verified by the signing server 209, the signing server 209 may determine whether or not the author/user 201 has previously established its credentials with the signing server 209. In some cases a credential database 215 may be utilized and/or queried to determine whether or not the author/user 201 has already established credentials with the signing server 209. After the identity of the author/user 201 is verified by the signing server 209, a session key 212 in the form of a private key is transmitted back across the network 203 to the author/user 201. The author/user 201 may then use this session key to sign an electronic document or otherwise generate a signed document 213. In some cases the signed document 213 may be transmitted across a network 203 to a recipient 202 who utilizes a computer system 214. In some cases the recipient 202 may be an additional signing party, or may be an ultimate recipient of the signed document 213. If recipient 202 is an additional signing party, they may also be required to utilize the signing server 209 to digitally sign the signed document 213.

Figure 3:
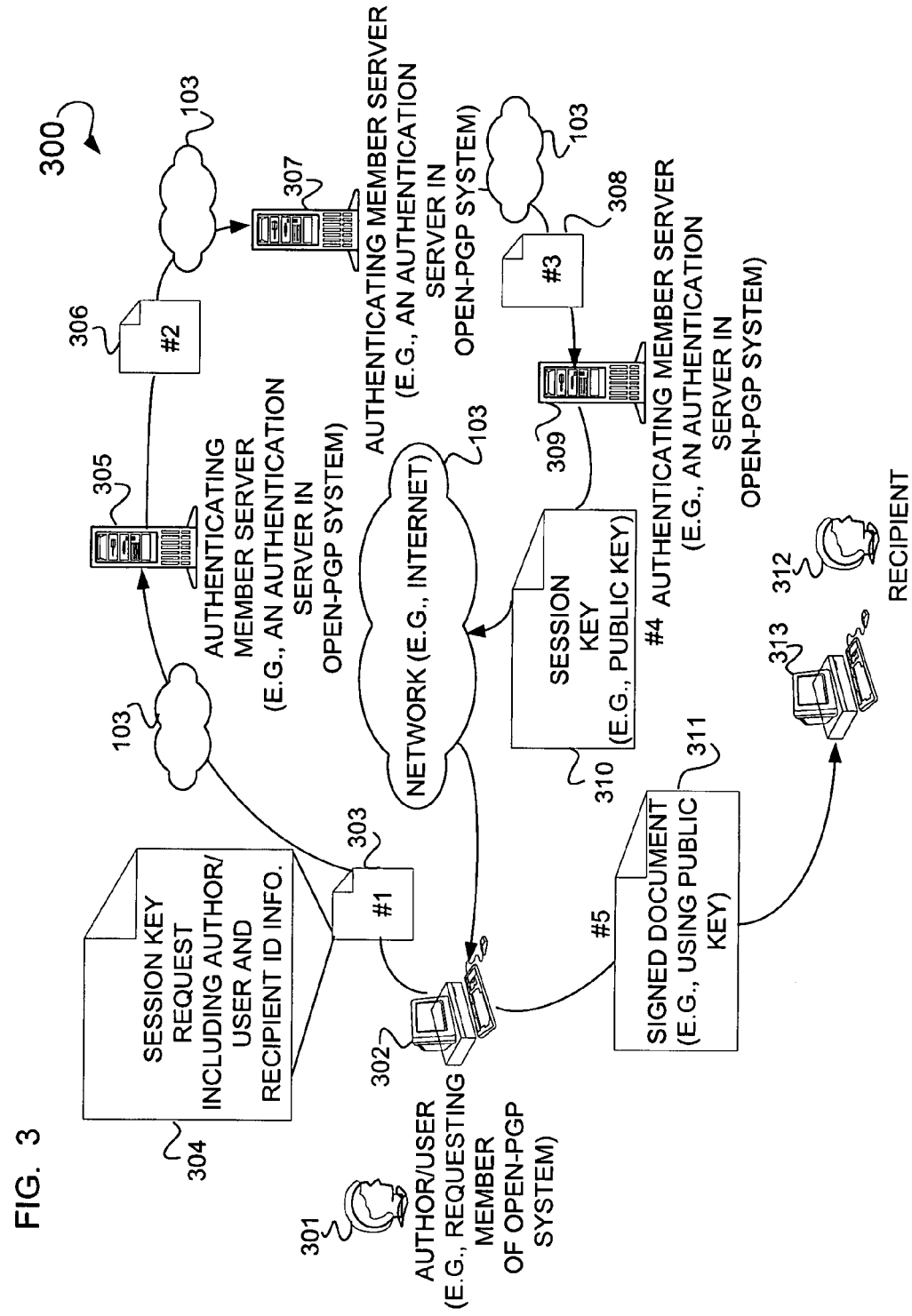
FIG. 3 is a diagram of a system illustrating the use of an open Pretty Good Privacy (PGP) system to verify the identity of an author and/or user, and further to provide a public key to be used to sign an electronic document, according to an example embodiment.

FIG. 3 is a diagram of an example system 300 illustrating the use of an open PGP system to verify the identity of an author and/or user, and further to provide a public key to be used to sign an electronic document. In contrast to a PKI model where the functionality of an identity provider and a signing server are distinct, in an open PGP system these functionalities are combined such that a member of a web of trust may both verify the identity of an author/user 301, and/ or also have the public key information for a particular recipient 312. In some cases, a recipient 312 may require that multiple members (e.g., authenticating member server 305, 307, and 309) of the open PGP system authenticate, or otherwise validate, the identity of an author/user 301 prior to providing the public key for the recipient 312 to the author/ user 301.

Illustrated is an author/user 301 who, utilizing a computer system 302, generates a session key request 303. The session key request 303 may contain data such as data 304 that includes, for example, the author/user's 301 identity and the recipient's identity information. The data 304 may be the author/user 301's user identification and password, a symmetric or asymmetric key (e.g., a session key 310), or some other unique identifying information. The session key request 303 may be formatted, for example, using XML, SAML, or some other suitable format. Once the session key request 303 is generated and formatted, it is sent over a network 103 to an authenticating member server 305. The authenticating member server 305 may then verify the identity of the author/user 301 and make a determination as to whether or not it has the session key for the identified recipient 312, and/or whether it can provide this key to the author/user 301. As previously alluded to, in certain cases multiple layers of authentication may need to be addressed prior to the providing of a session key 310 to the author/user 301. This requirement of multiple layers of authentication may be established or otherwise dictated by the recipient 312. As shown in FIG. 3, for example, the authenticating member server 305 determines that additional layers of authentication are required before the session key 306 is generated and provided to the author/user 301. Next, a session key request 306 is generated and transmitted by the authenticating member server 305, and is sent to an authenticating member server 307 across the network 103. Once the session key request 306 is received by the authenticating member server 307, the identity of the author/user 301 is verified and a determination is made as to whether or not the authenticating member server 307 has the session key for the identified recipient 312, and/or whether it can provide this session key to the author/user 301. As shown in FIG. 3, the authenticating member server 307 determines that an additional layer of authentication needs to be met, such that a further session key request 308 is transmitted across the network 103 to an authenticating member server 309.

Once the session key request 308 is received at the authenticating member server 309, the authenticating member server 309 makes a determination as to whether or not additional layers of authentication need to be met, and/or verifies the identity of the author/user 301. Here, the authenticating member server 309 determines that no further layers of authentication need to take place, and that the authenticating member server 309 does have the session key for the identified recipient. A session key 310 is then generated which, in some cases, is a private key that is part of an asymmetric public key/private key pair. It is transmitted across the network 103 to the computer system 302 being utilized by the author/user 301. After the session key 310 is received, it is used to sign a document 311. Once signed, the document 311 is then provided to a recipient 312 who utilizes a computer system 313. The signed document 311 may be transmitted across the previously illustrated network 103. In other cases it may be provided in some other manner to the recipient 312.

In certain cases the previously illustrated authenticating member servers (e.g., 305, 307 and 309) may be equally trusted, whereas in other cases one or more of these authenticating member servers may be more trusted than another. For example, if the authenticating member server 307 makes a determination that the author/user 301 and their identity is valid, and the authenticating member server 307 has a session key for a particular identified recipient (e.g., 312), then that authenticating member server 307 may provide the session key for that particular identified recipient to the author/user 301. It may, however, only provide this session key where the identified recipient 312 has agreed that the authenticating member server 307 may act independently of any verification performed by other authenticating member servers (e.g., provide the session key based solely upon its own verification of the author/user).

Example User Interface

Figure 4:
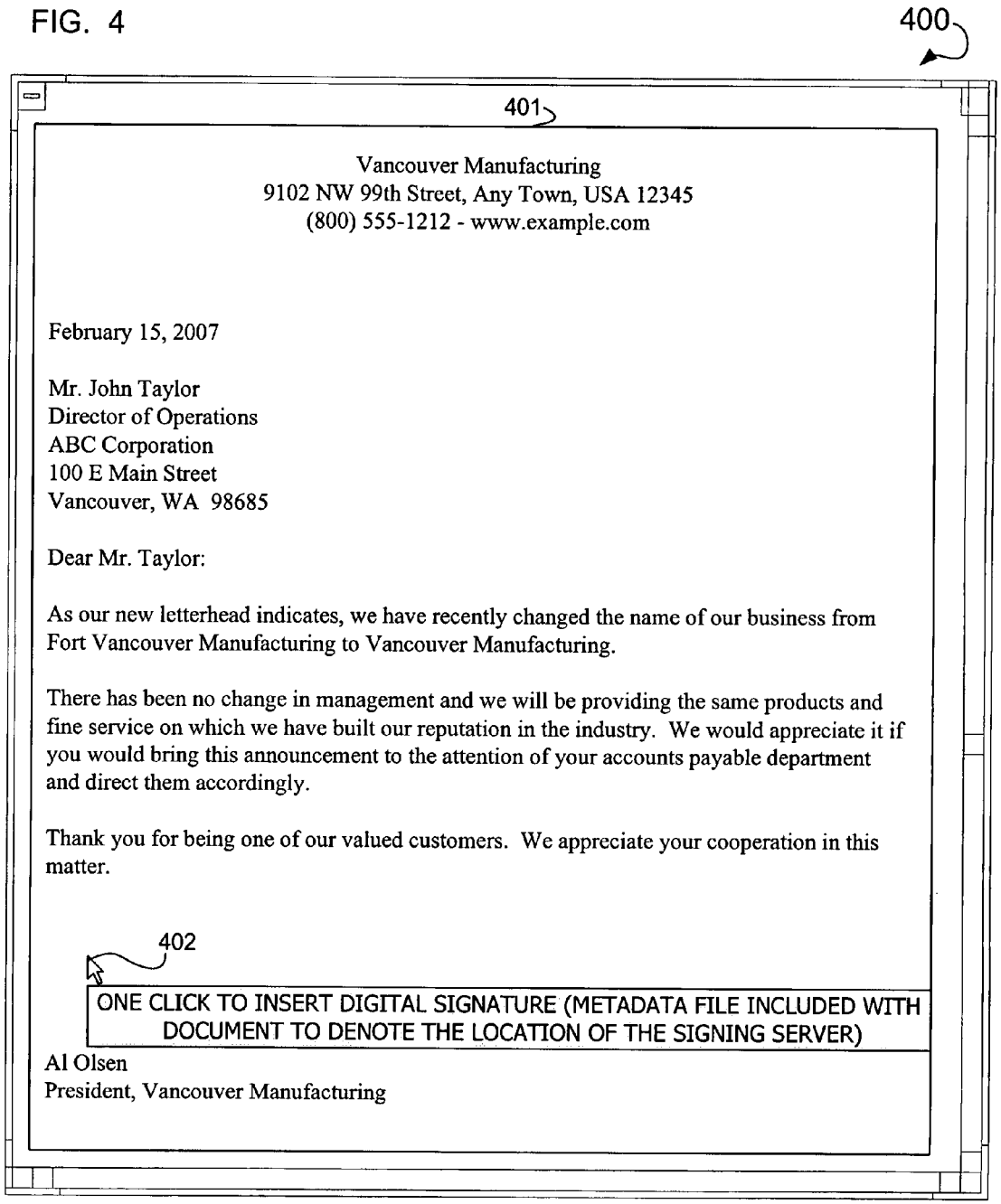
FIG. 4 is a diagram of a Graphical User Interface (GUI) illustrating the one-click signing of an electronic document, according to an example embodiment.

FIG. 4 is a diagram of an example GUI 400 illustrating the one-click signing of an electronic document. Illustrated is a displayed area 401 of an electronic document containing a signature block wherein, through the use of a pointer and some type of input device (e.g., a mouse, a light pen, or a touch screen), a user 101 may sign the displayed area 401 of the electronic document. This displayed area 401 is the area of an electronic document visible to a user. This signing may occur by merely executing a single action (e.g., clicking) anywhere in the displayed area 401. While the displayed area 401 may visually display certain types of signature data, a signed or unsigned electronic document (e.g., an unsigned electronic document that is to be signed) may also contain metadata. This metadata may, for example, be associated with the signed or unsigned electronic document as a metadata file written in XML. Contained within this metadata file may be the URL of a signing server, such as signing server 113 or 209. This URL may be used during a subsequent verification process to determine the location of the signing server.

Figure 5:
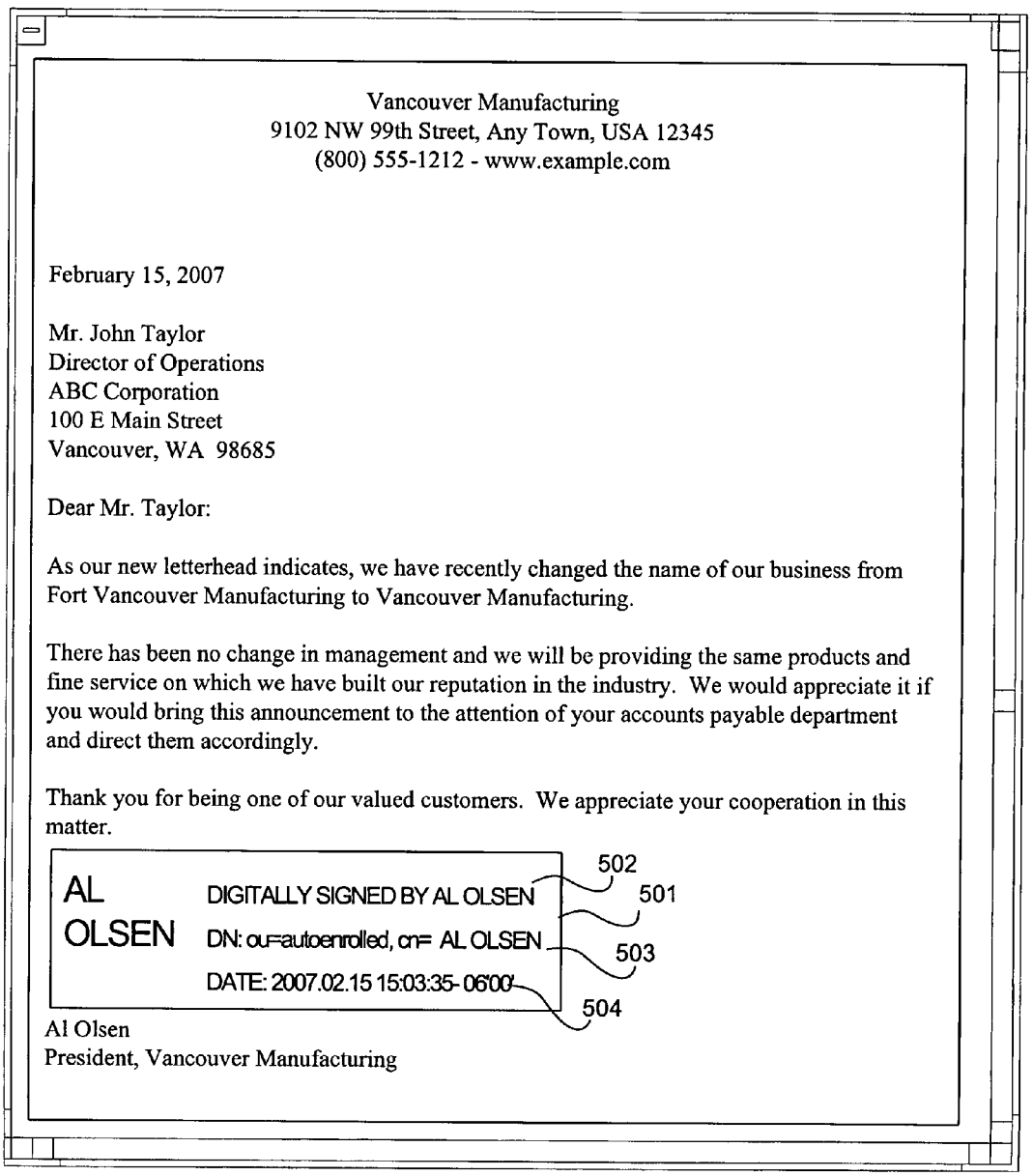
FIG. 5 is a diagram of a GUI reflecting a digitally signed electronic document, according to an example embodiment.

FIG. 5 is a diagram of an example GUI 500 illustrating a digitally signed electronic document. Illustrated is a certifying signature 501 containing a number of data fields. Data field 502 contains the name of the signing party. Organization Unit field 503 contains the name of the organization that the signing party is a part of, and also whether or not, for example, this signing process is automatic in nature based upon certain types of preferences set for the document. Organization Unit field 503 also contains the name of the certifying party. Further illustrated is a Timestamp field 504 containing date and time information as to when the electronic document was signed.

Figure 6:
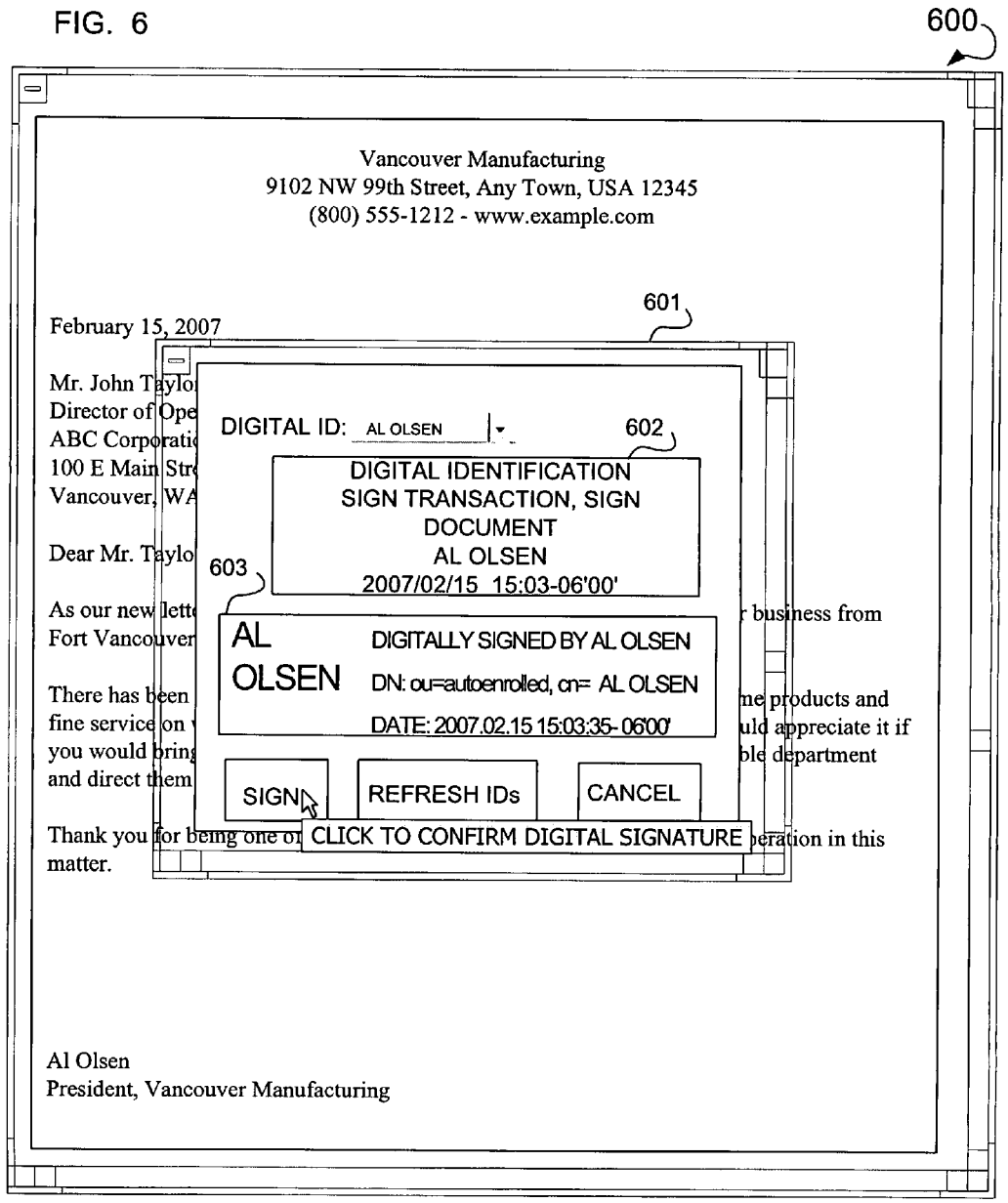
FIG. 6 is a diagram of a GUI illustrating a confirmation dialog box, according to an example embodiment.

FIG. 6 is a diagram of an example GUI 600 illustrating a confirmation dialog box (e.g., a certified document dialog box). Illustrated is a confirmation dialog box 601 that contains data relating to the signing party. In certain cases, use of confirmation dialog box 601 may be required prior to the digital signing of an electronic document, whereas in other cases it may be optional. Put another way, in certain cases a user (e.g., 101, 201, or 301) may be able to merely click on the displayed area (e.g., displayed area 401) within a electronic document without having to see the confirmation dialog box 601. In other cases where a user (e.g., 101, 201, or 301) clicks on the displayed area of an electronic document, the confirmation dialog box 601 may act as a pop-up wherein certain information regarding the signing party (e.g., the user 101, 201, or 301) may have to be verified. Illustrated is a confirmation dialog box 601 containing, among other things, a field 602 relating to the name of the signing party, and the date and time that the party seeks to sign a particular document. Further illustrated is a field 603 that reflects the data to be inserted as a part of a signature block, such as certifying signature 501. Also illustrated are various types of buttons or other screen widgets that may be used to facilitate the signing of an electronic document.

Example Logic

Figure 7:
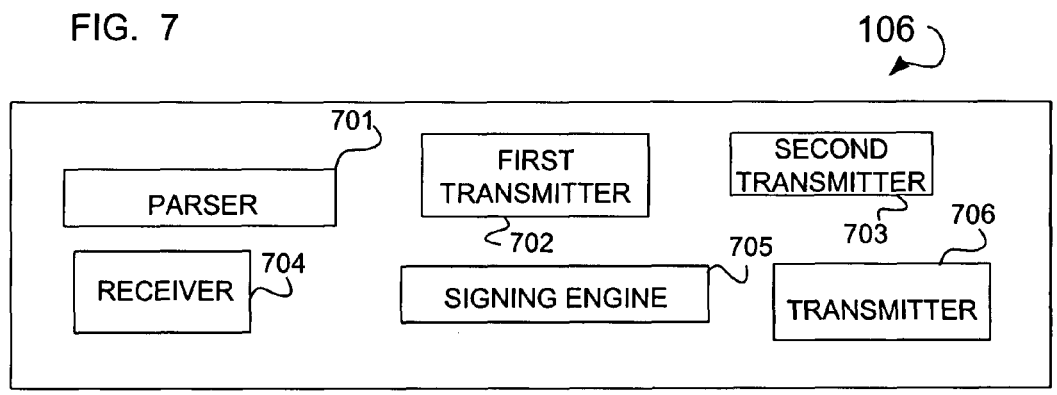
FIG. 7 is a block diagram of a computer system illustrating the various blocks or modules that may make up a portion of this computer system used to initiate the digital signing of a electronic document, according to an example embodiment.

FIG. 7 is a block diagram of an example computer system 106, illustrating the various blocks or modules that may make up a portion of the computer system 106. These blocks may be implemented in hardware, firmware, or even software. Illustrated is a computer system 106 that includes a parser 701 to parse seed data from digital content, the seed data identifying a signing entity, a first transmitter 702 to transmit identifier data to the signing entity identified by the seed data, a second transmitter 703 to transmit content information relating to the digital content to the signing entity, and a receiver 704 to receive digitally signed content information relating to the digital content, the digitally signed content information signed by the signing entity. Further, the seed data may be a URL value extracted from the digital content. Additionally, the identifier data may be generated through the use of SSO authentication. Moreover, the content information may include at least one of a document digest, or an electronic document, and the digitally signed content information is content information signed with a credential. In addition, the parsing may be initiated with a single action.

Some embodiments may include a computer system 106 with a parser 701 to parse seed data from digital content, the seed data identifying a signing entity, a transmitter 706 to transmit identifier data to the signing entity identified by the seed data, a receiver 704 to receive a credential from the signing entity, the credential used to sign the digital content, and a signing engine 705 to sign the digital content using the credential. Moreover, the seed data may be a URL value extracted from the digital content. Additionally, the identifier data may be generated through the use of SSO authentication. Further, the credential may be an X.509 credential, and the parsing may be initiated with a single action.

Figure 8:
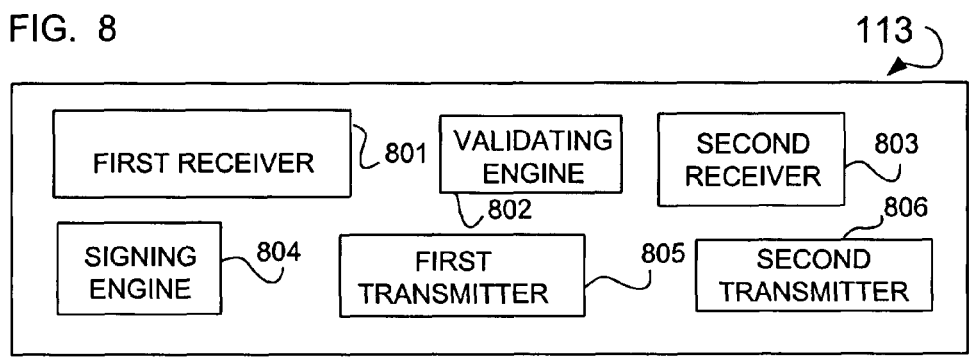
FIG. 8 is a block diagram of a signing server illustrating the various blocks or modules that may make up a portion of this signing server used as a proxy to digitally sign a document, according to an example embodiment.

FIG. 8 is a block diagram of an example computer system in the form of a signing server 113, illustrating the various blocks or modules that may make up a portion of the signing server 113. These blocks may be implemented in hardware, firmware, or even software. Illustrated is a computer system such as a signing server 113 the includes a first receiver 801 to receive identifier data, the identifier data identifying a user who selects a signing entity to digitally sign content information, a validating engine 802 to validate the identifier data against a credential database, a second receiver 803 to receive content information relating to digital content to be digitally signed, a signing engine 804 to sign the content information with a credential, and a first transmitter 805 to transmit the digitally signed content information. Further, the identifier data may be generated through the use of SSO authentication, and the content information includes at least one of a document digest, or an electronic document. In some embodiments, the computer system (e.g., the signing server 113) may further include a second transmitter 806 to transmit the digitally signed content information to the user.

Figure 9:
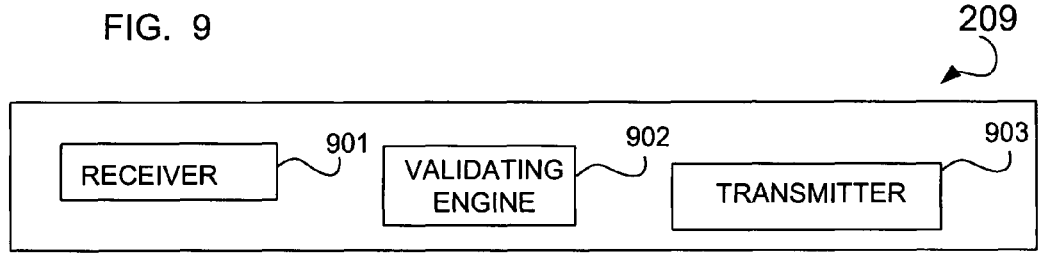
FIG. 9 is a block diagram of a signing server illustrating the various blocks or modules that may make up a portion of this signing server used to generate a credential to be used in the digital signing of a electronic document, according to an example embodiment.

FIG. 9 is a block diagram of an example signing server 209 illustrating the various blocks or modules that may make up a portion of the signing server 209. These modules may be implemented in hardware, firmware, or even software. Illustrated is a computer system such as a signing server 209 that includes a receiver 901 to receive identifier data, the identifier data identifying a user who selects a signing entity to generate credential to be used to digitally sign digital content, a validating engine 902 to validate the identifier data, the identifier data validated against a credential database, and a transmitter 903 to transmit a credential, the credential to be used to digitally sign the digital content. Moreover, the identifier data may be generated through the use of SSO authentication. Additionally, the credential may be an X.509 credential. In some embodiments, the functionality of the signing server 113 and that of the signing server 209 is combined into one signing server. This combined functionality is further illustrated in FIGS. 10-11 and the subsequent FIG.s related to these figures.

Figure 10:
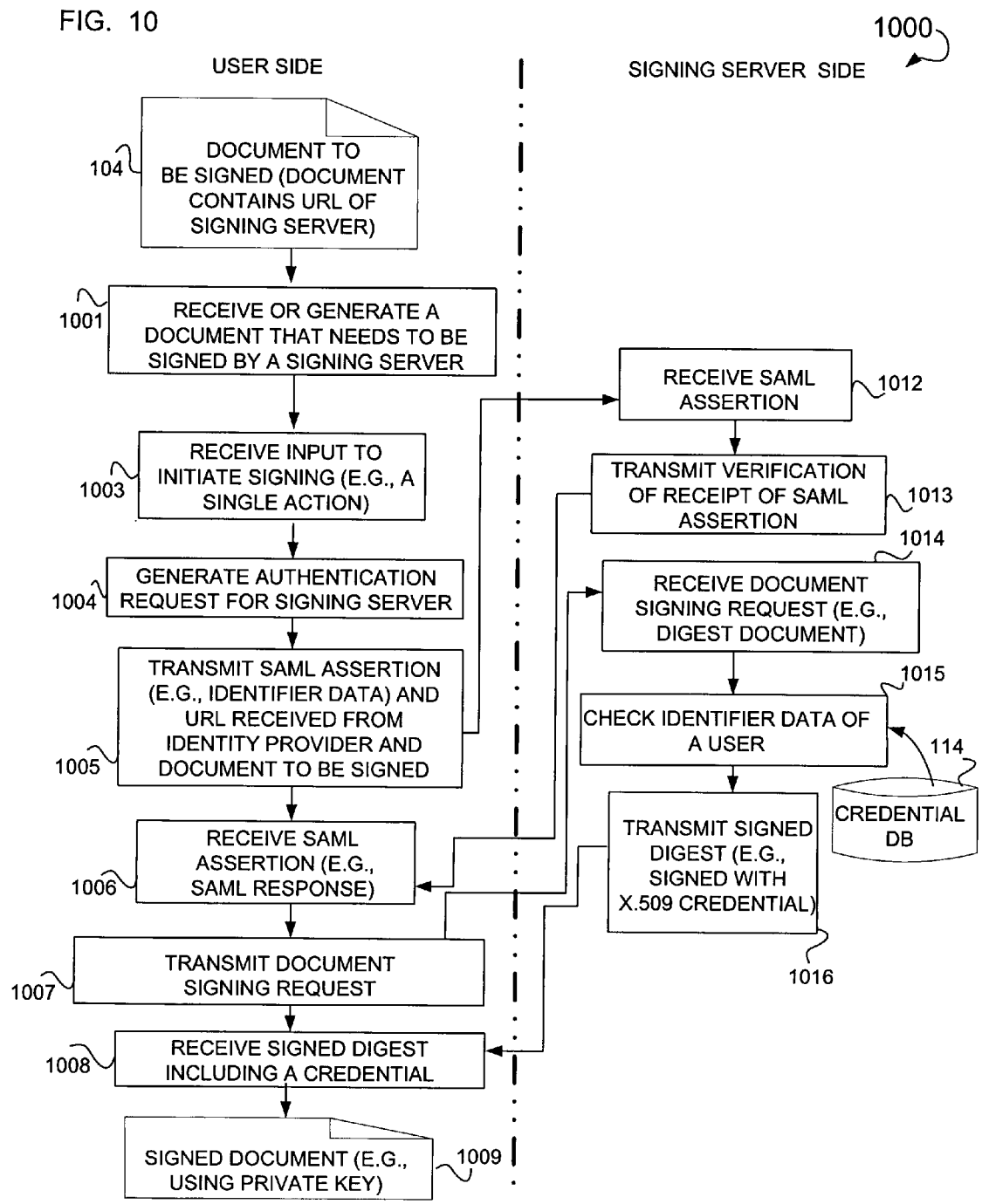
FIG. 10 is a dual stream flow chart illustrating the various operations used to digitally sign an electronic document through the execution of a single action, according to an example embodiment.

FIG. 10 is a dual stream flow chart illustrating the various operations used to digitally sign an electronic document with a single action. Illustrated is a first stream titled "User Side" containing various operations 1001 through 1008, and a second stream titled "Signing Server Side" containing various operations 1012 through 1016. With respect to the user side operations, in some cases, an electronic document 104 is provided to an operation 1001 or otherwise accessed by this operation. The operation 1001 receives or generates a document that needs to be signed by a signing server. The document 104 is then provided to an operation 1003 that receives input to initiate digital signing as the case may be. This input may be, for example, a single action such as, for example, a mouse click, or the passing of a screen pointer over a particular area of a GUI where the pointer is controlled by some type of input device such as a mouse, a light pen or even a touch screen. Production of a sound may be a type of single action, as may some other types of single actions.

Once operation 1003 is executed, an operation 1004 is executed that generates an authentication request for a signing server. This authentication request is then provided to an operation 1005, which transmits a SAML assertion (e.g., identifier data) that includes a URL parsed from the metadata associated with the document 104. This SAML assertion and URL data is then provided to or otherwise accessed by an operation 1012 that receives this SAML assertion information. Once received, an operation 1013 is executed that transmits a SAML assertion from the signing server side to the user side. Then, in some cases, an operation 1006 may be executed to receive the SAML assertion (e.g., SAML response). Next, an operation 1007 is executed that transmits a document signing request from the user side to an operation 1014 that receives or otherwise accesses the document signing request. In some cases, a document signing request may be a digest of the document 104, a digest generated using some type of hashing function. Then, an operation 1015 is executed that checks the identifier data submitted by a user against certain credentials contained in a credential database 114 (e.g., a persistent or non-persistent data store). Once these credentials are verified, an operation 1016 is executed that transmits a signed digest along with some type of credential such as, for example, an X.509 credential (e.g., a private key containing additional credential information regarding the requesting user). This signed digest is then received or otherwise accessed via the execution of an operation 1008. In some cases, once received, the private key contained in the signed digest is extracted and a signed document 1009 is generated.

Figure 11:
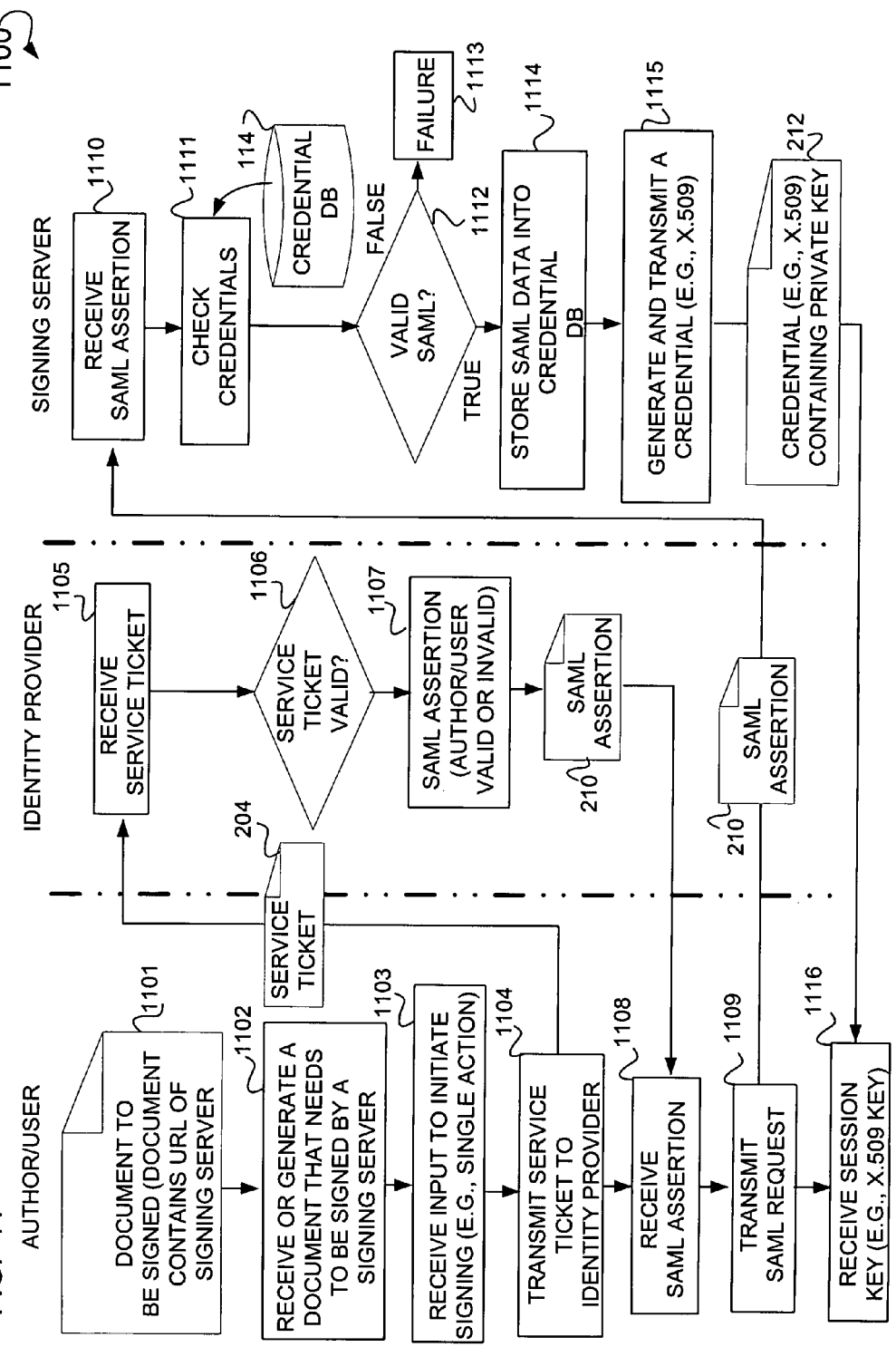
FIG. 11 is a tri-stream flow chart illustrating a scenario where an author and user are the same person, according to an example embodiment.

FIG. 11 is a tri-stream flow chart illustrating a scenario 1100 where an author and user are the same. Illustrated is a first stream titled "Author/User" containing various operations 1102 through 1109 and 1116, a second stream titled "Identity Provider" containing operations 1105 through 1107, and a third stream titled "Signing Server" containing various operations 1110 through 1115. With respect to the first stream titled "Author/User", a document to be signed 1101 is provided or otherwise accessed by an operation 1102. This document to be signed contains, among other things, the URL of a signing server. Once the operation 1102 is executed, an operation 1103 is executed that receives input to initiate signing. This input may be a single action, for example, a mouse click or other single action as defined above.

Once input is received to initiate signing, an operation 1104 is executed that transmits a service ticket to an identity provider. This service ticket, such as service ticket 204, is then provided to an operation 1105 residing as a part of the identity provider. Next, a decisional operation 1106 is executed to determine whether a service ticket is valid. In cases where validity or invalidity is determined, an operation 1107 is executed that generates the SAML assertion, such as SAML assertion 210. SAML assertion 210 may, among other things, provide formatted data in the form of XML that may verify or otherwise instruct the author/user as to whether their identity has been validated. The SAML assertion 210 may be received or otherwise accessed by an operation 1108.

Once the SAML assertion 210 is received, an operation 1109 is executed that transmits the SAML assertion 210 (e.g., a SAML response) to, for example, a signing server such as signing server 209. In certain cases operation 1109 may only execute where the identity of the author/user, such as author/user 201, has been verified by the identity provider, such as identity provider 206. Once operation 1109 is executed and the SAML assertion is transmitted to the signing server, an operation 1110 is executed that receives or otherwise accesses the SAML assertion 210.

Next, an operation 1111 is executed that checks the credentials of the author/user, such as author/user 201 that is associated with the SAML assertion 210. In certain cases a credential database 114 may be used by the operation 1111 to verify or otherwise check the credentials of the author/user 201. Next, a decisional operation 1112 is executed that determines whether a valid SAML assertion has been provided. In cases where decisional operation 1112 evaluates to "false", then a failure operation 1113 is executed wherein the author/user 201 may be notified by the signing server, such as signing server 209, of the failure of this SAML assertion to correctly identify the user. In certain cases, other bases for failure may also exist. In cases where decisional operation 1112 evaluates to "true", an operation 1114 is executed that stores the data extracted from the SAML assertion into a credential database, such as credential database 114. This data may, for example, identify the user as one authorized to receive future services from the signing server. Then, an operation 1115 is executed that generates and transmits a session key, such as an X.509 credential containing the session key. The session key may be, for example, a private key portion of an asymmetric public key/private key pair. Once the operation 1115 is executed, a session key 212 is generated contained within the X.509 credential and sent from the signing server 209 to the author/user 201 who utilizes a computer system 205 (FIG. 2). Then an operation 1116 is executed that receives the session key and in some cases extracts the private key for use in the digital signing of an electronic document.

Figure 12:
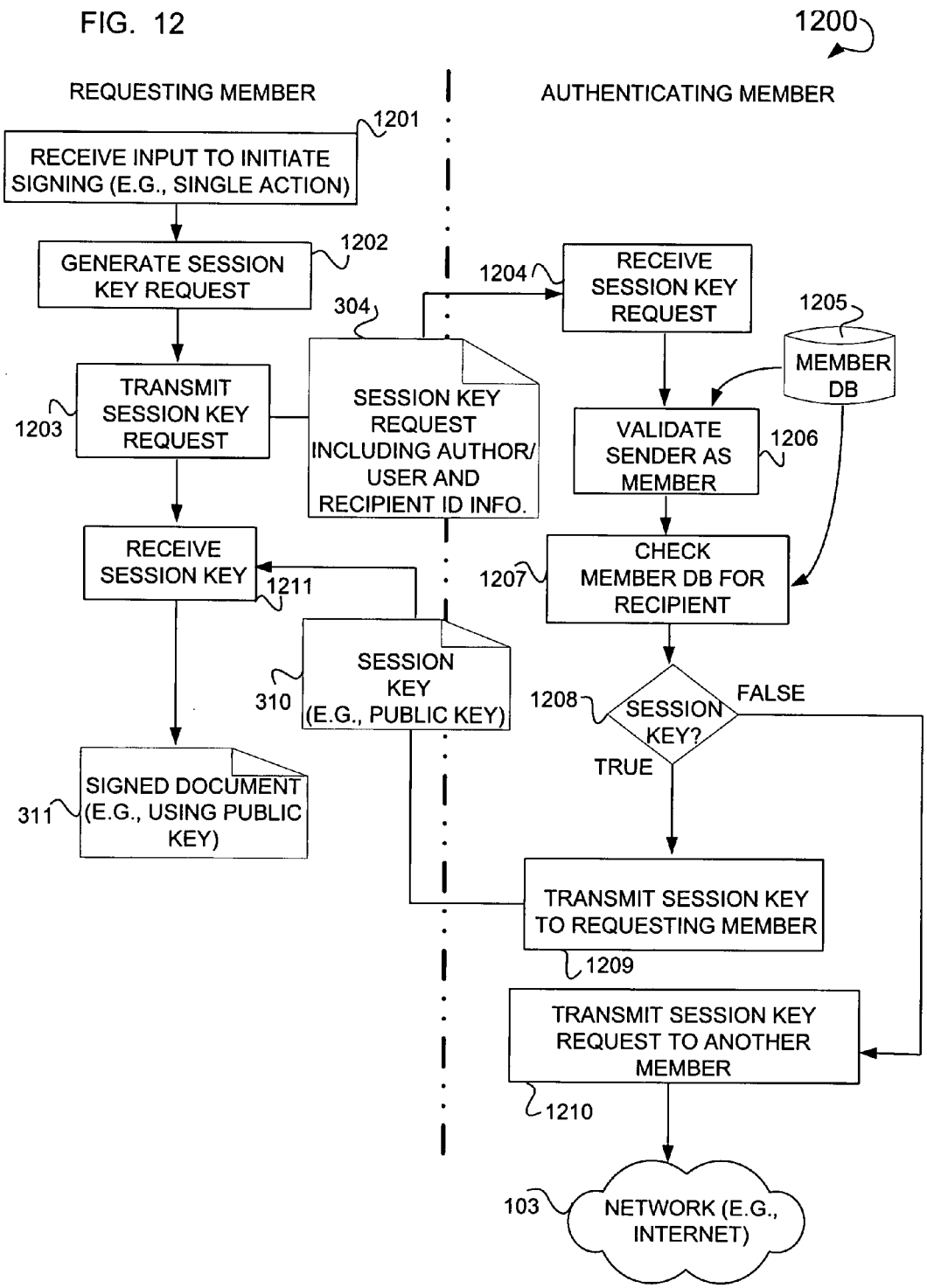
FIG. 12 is a dual-stream flow chart illustrating a method used within the context of an open PGP system, according to an example embodiment.

FIG. 12 is a dual-stream flow chart illustrating an example method 1200 used within the context of an open PGP system as illustrated in FIG. 3 (e.g., system 300). Illustrated is a first stream titled "Requesting Member" containing various operations 1201, 1202, 1203 and 1211. Also illustrated is a second stream titled "Authenticating Member" containing various operations 1204, 1206, 1207, 1208, 1209 and 1210. With respect to the first requesting member stream, in some cases an operation 1201 is executed that receives input to initiate a signing. As previously illustrated, this input may be a single action such as the click of a mouse or other single action as defined above. Next, an operation 1202 is executed that generates a session key request that includes, for example, the identity of an author and/or user and recipient ID information. Once this session key request (e.g., 303) is generated, an operation 1203 is executed that transmits the session key request and data contained therein, such as data 304, to an operation 1204 that, when executed, receives a session key request. Operation 1204 may reside on, for example, an authenticating member server such as authenticating member server 305, 307 or even 309.

Next, an operation 1206 is executed that validates the sender as a member of the open PGP system (e.g., the ring of trust), the sender in this case being, for example, the author/user 301. In order to validate the sender as a member, a member database 1205 may be accessed. Then, an operation 1207 is executed that checks the member database 1205 to see if the recipient, such as recipient 312 is also a member. Next, a decisional operation 1208 is executed that determines whether or not a valid session key has been provided by the requesting member. In cases where decisional operation 1208 evaluates to "true", an operation 1209 may be executed that transmits a session key to the requesting member, wherein this session key may be, for example, a public key generated by the recipient 312 to be used to digitally sign documents sent to the recipient 312 by, for example, an author/user 301. In certain cases, rather than operation 1209 sending a session key as a response to decisional operation 1208 evaluating to "true", a further session key such as session key 306 may be sent to another authenticating member for additional authentication to take place. In cases where decisional operation 1208 evaluates to "false" (e.g., the authenticating member server does not have the session key for the particular recipient), an operation 1210 is executed that transmits the session key request to another authenticating member server (e.g., 307 and/or 309). The session key request is transmitted across a network, such as network 103.

In certain cases, the number of layers of authentication may be based upon requirements that are set out by the recipient 312 These requirements may dictate that only one authenticating member server may need to verify the identity of the author/user, or that multiple authenticating member servers may be used to authenticate the identity of an author/user such as author/user 301. In certain cases, the recipient, such as recipient 312, may give preference to one or more of the authenticating member servers.

FIG. 13 is a dual-stream flow chart illustrating an example of operation 1001. Illustrated is a first stream titled "User Side" containing various operation 1301 through 1303, and a second stream titled "Identity Provider" containing operations 1304 through 1309. With respect to the user side of the dual-stream flow chart, in some cases an operation 1301 is executed that utilizes some type of validation mechanism to validate the identity of, for example, a user 101 and/or an author/user 201. In certain cases this validation mechanism may be a user identification and password supplied by the user 101 and/or author/user 201 at the time they log on to their respective computer systems 106 and/or 205. This validation mechanism and the data supplied therefrom, in certain cases, is provided to or otherwise accessed by an operation 1302 that transmits a service request including TGT data (e.g., 107) to an operation 1304 that resides as a part of the identity provider. Operation 1304 receives or otherwise accesses the service request 107 and provides it to an operation 1305 that may then access a credential database 1306. The data retrieved from the credential database is then provided to a decisional operation 1307 that determines whether or not the data provided from the validation mechanism (e.g., user identification and password) is valid when compared to data retrieved from the credential database 1306. In cases where decisional operation 1307 evaluates to "true", a further operation 1308 is executed that transmits a SAML assertion (e.g., a SAML assertion 109) recognized by an signing server (e.g., signing server 113) to an operation 1303 that receives the SAML assertion 109. In cases where decisional operation 1307 evaluates to "false", an operation 1309 is executed that transmits a non-validation message to the user, for example the user 101 and/or the author/user 201. In certain cases, an operation 1303 is executed that receives a service ticket where the decisional operation 1307 evaluates to "true".

FIG. 14 is a flow chart illustrating an example of operation 1004. Illustrated is an operation 1401 that parses a document to be signed, such as document 104, to get the URL of a signing server, such as signing server 113. Once parsed, an operation 1402 is executed that combines the URL of the signing server and data relating to a SAML assertion that is received from an identity provider such as identity provider 108. Next, an operation 1403 is executed that formats the SAML assertion and URL data of the signing server using, for example, an XML format.

FIG. 15 is a diagram of an example data packet 1500 that may be used to transmit service ticket and URL data, such as the XML data stream or file 110 (e.g., service ticket and URL data) shown in FIG. 1. Illustrated are various fields of the data packet 1500 including a binding and profile field 1501 that may be formatted using certain types of protocol such as a Hypertext Transfer Protocol (HTTP) used in conjunction with a Transmission Control Protocol/Internet Protocol (TCP/IP). Contained within the binding and profile field 1501 is a protocol field 1502 that may contain, for example, a Simple Object Access Protocol (SOAP) message. A SOAP header 1503 is illustrated, as is an assertion field 1504 containing, for example, a SOAP body and a SAML request or response field 1505 that contains, for example, the actual service ticket data verifying the identity of the user 101 and/or author/user 201. In certain cases, some other technology other than SOAP may be utilized as the basis for transmitting messages over a network.

FIG. 16 is a flowchart illustrating an example of operation 1007. Illustrated is an operation 1601 that receives document data and a SAML assertion. Next, an operation 1602 is executed that parses the document data to determine the length of a message. Further, an operation 1603 is executed that passes the message through some type of hashing algorithm such as MD5 and/or SHA-1. These hashing algorithms may be contained in a hash algorithm library database 1605. Once combined, an operation 1604 is executed that formats the message digest, for example, by converting into some type of XML format.

Figure 17:
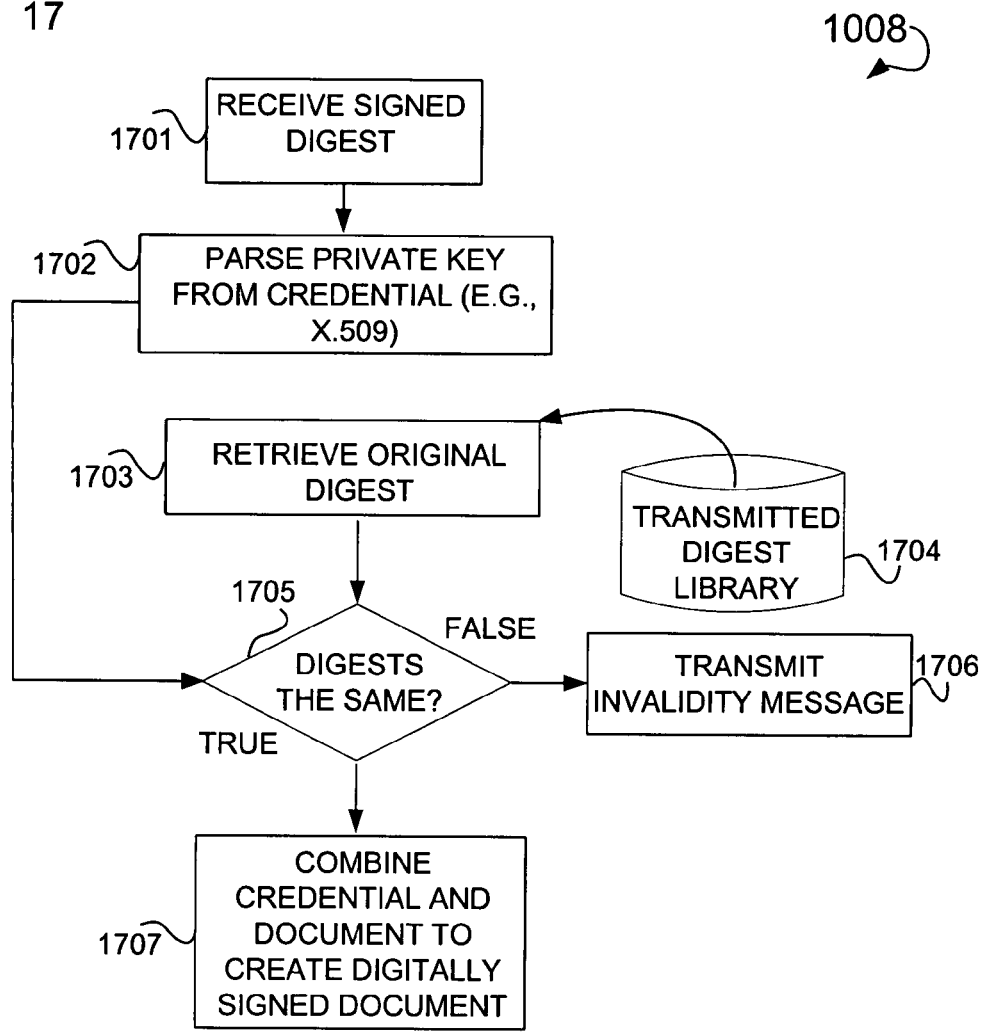
FIG. 17 is a flowchart illustrating an operation to receive or otherwise access one or more digests for verification purposes, according to an example embodiment.

FIG. 17 is a flowchart illustrating an example of operation 1008. Illustrated is an operation 1701 that receives a signed digest. Once received, an operation 1702 is executed that parses a private key from the signed digest, and, more particularly, from a credential contained as a part of the signed digest. This credential may be, for example, an X.509 credential. Next, a decisional operation 1705 is executed that determines whether two digests are the same. In order for decisional operation 1705 to execute, an operation 1703 must be executed that receives an original digest, wherein this original digest may be stored in, for example, a transmitted digest library 1704. Once the original digest is received via the execution of operation 1703, decisional operation 1705 compares the signed digest to the original digest. In cases where decisional operation 1705 evaluates to "false", an operation 1706 is executed that transmits one or more invalidity messages stating that a digest are not the same and that the document received from, for example, an author 102 in the document digest received in the signing server 113 are not the same and have been, for example, tampered with. In cases where decisional operation 1705 evaluates to "true", an operation 1707 is executed that combines a credential and a document to create a digitally signed document. In some cases, only the signing key may be combined with the document to be signed, whereas in other cases the complete credential may be combined with the document to be signed to generate a signed document.

FIG. 18 is a flowchart illustrating an example of operation 1013. Illustrated is an operation 1801 that parses a SAML assertion, for example, a SAML request. Once parsed, an operation 1802 is executed that validates a user such as, user 101, based upon a SAML assertion and accepted credentials. In some cases, these credentials are contained in the credential database 114. Once validation occurs, an operation 1803 is executed that generates the SAML assertion, for example, a SAML response.

FIG. 19 is a flowchart illustrating an example of operation 1016. Illustrated is an operation 1901 that retrieves a private key wherein this private key is retrieved from, for example, an X.509 credential. Once retrieved, an operation 1902 is executed that combines a document digest and a private key. Once combined, an operation 1903 is executed that formats and transmits a combination of the document digest and the private key.

Example Database

Some embodiments may include the various databases (e.g., 114, 215, 1205, 1306, 1606, and 1704) being relational databases, or, in some cases, OLAP based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, containing multidimensional data from which data is selected from or inserted into using a Multidimensional Expression Language (MDX) may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, or optimization algorithm known in the art.

Figure 20:
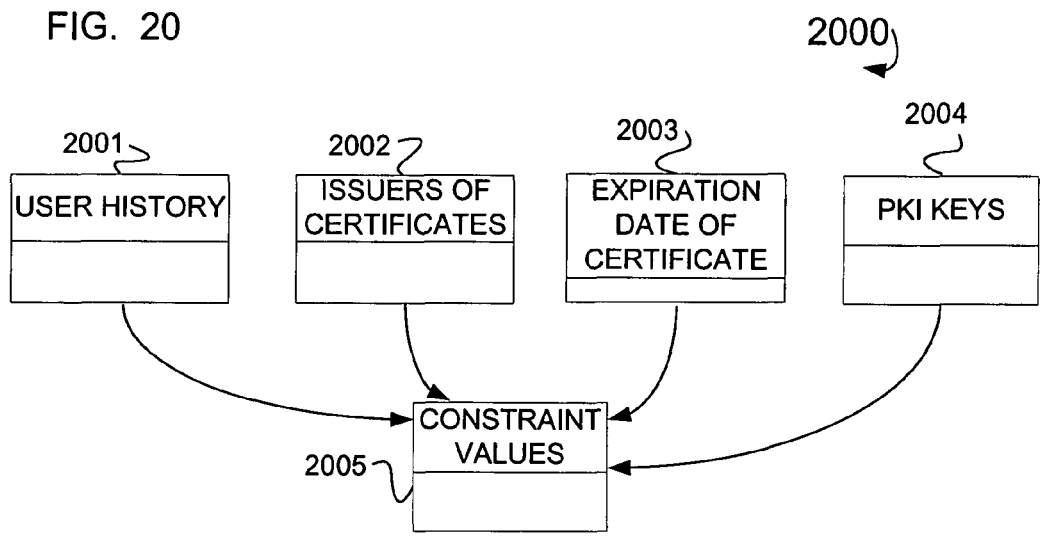
FIG. 20 is a Relational Data Schema (RDS) illustrating various database tables that may make up, for example, the credential database, according to an example embodiment.

FIG. 20 is an example RDS 2000 illustrating various database tables that may make up, for example, the credential database 114. These tables, while not exclusive, may include, for example, a user history table 2001 containing a history of various documents signed by a particular user. The data contained in table 2001 may be, for example, some type of unique identifier for a user in the form of an integer, float, double or some other type of uniquely identifying value. Further, a table 2002 is illustrated that contains the identities of various issuers of certificates. These identities may include, for example, the identities of various signing servers, such as signing server 113, wherein the signing servers may be identified by, for example, a URL or other uniquely identifying value, wherein this uniquely identifying value may be, for example, an IP, or MAC address in the form of a string data type or some other type of suitable data type. Further illustrated is a table 2003 that contains the expiration date of a particular certificate. This date may be the date upon which a particular certificate issued by, for example, a signing server, may no longer be valid. It may be a date data type, string data type or some other suitable data type. Next, a table 2004 is illustrated that contains various PKI keys (e.g., the private key of a public key/private key pair for a particular recipient). This PKI key may have, for example, a bit value in the range of, for example, 64 bits to 1,024 or even 2,056 bits and may be, for example, a Binary Large Object (BLOB) or some other suitable data type. Further, a table 2005 is illustrated that contains various constraint values uniquely identified at various data values or tuples contained in each one of the previously illustrated tables 2001 through 2004. These constraint values may be some type of unique integer value or other data type that may be used to assist with the unique identification of the tuples contained in each one of the previously illustrated tables.

Figure 21:
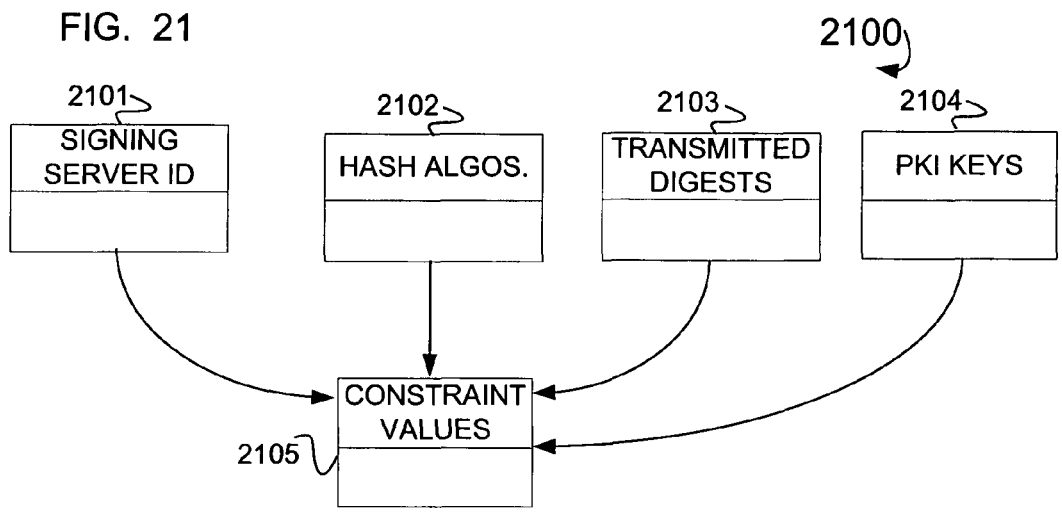
FIG. 21 is an RDS illustrating various database tables that may be part of a credential database or some other suitable database, according to an example embodiment.

FIG. 21 is a relational data schema 2100 illustrating various database tables that may be a part of, for example, a credential database 114 or some other suitable database. Illustrated are a number of database tables such as, for example, a signing server ID table 2101 that contains the ID of a particular signing server. This ID may be, for example, a URL or IP address and may be, for example, a string or other suitable data type. Next, a table 2102 is illustrated that contains various hashing algorithms. These hashing algorithms may be, for example, the previously illustrated MD5 or SHA-1 hashing algorithms and may be some type of suitable data type such as a Character Large Object (CLOB), or some other suitable data type. Also illustrated is a table 2103 that contains various transmitted digests. These transmitted digests may be, for example, various types of messages in the form of string data types. Further, a table 2104 is illustrated containing various PKI keys wherein these PKI keys may be, for example, a private key of a public key/private key pair and may be, for example, keys in the form of various 64 bit to 2,056 bit values wherein these bit values are contained as various types of BLOB data types or other suitable data types. Further, a constraint values table 2105 is illustrated that contains various constraint values used to constrain the various types of data contained in each of the previously illustrated tables 2101 through 2104. These constraint values may be, for example, some type of integer value used to uniquely identify each of the tuple entries for each of the tables 2101 through 2104. These constraint values, as previously illustrated, may be some type of integer value or some other suitable data type.

Component Design

Some example embodiments may include the above-illustrated operations being written as one or more software components. Common to many of these components is the ability to generate, use, and manipulate the above-illustrated UI elements and layout elements and the data associated therewith. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM) or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is remotely located from a second computer system containing an interface level (e.g., a GUI). These first and second computer systems can be configured in a server-client, peer-to-peer, or some other configuration. The various levels can be written using the above-illustrated component design principles and can be written in the same programming language or a different programming languages. Various protocols may be implemented to enable these various levels and the components contained therein to communicate regardless of the programming language used to write these components. For example, an operation written in C++ using Common Object Request Broker Architecture (CORBA) or Simple Object Access Protocol (SOAP) can communicate with another remote module written in JAVA™. Suitable protocols include SOAP, CORBA, and other protocols well-known in the art.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

Figure 22:
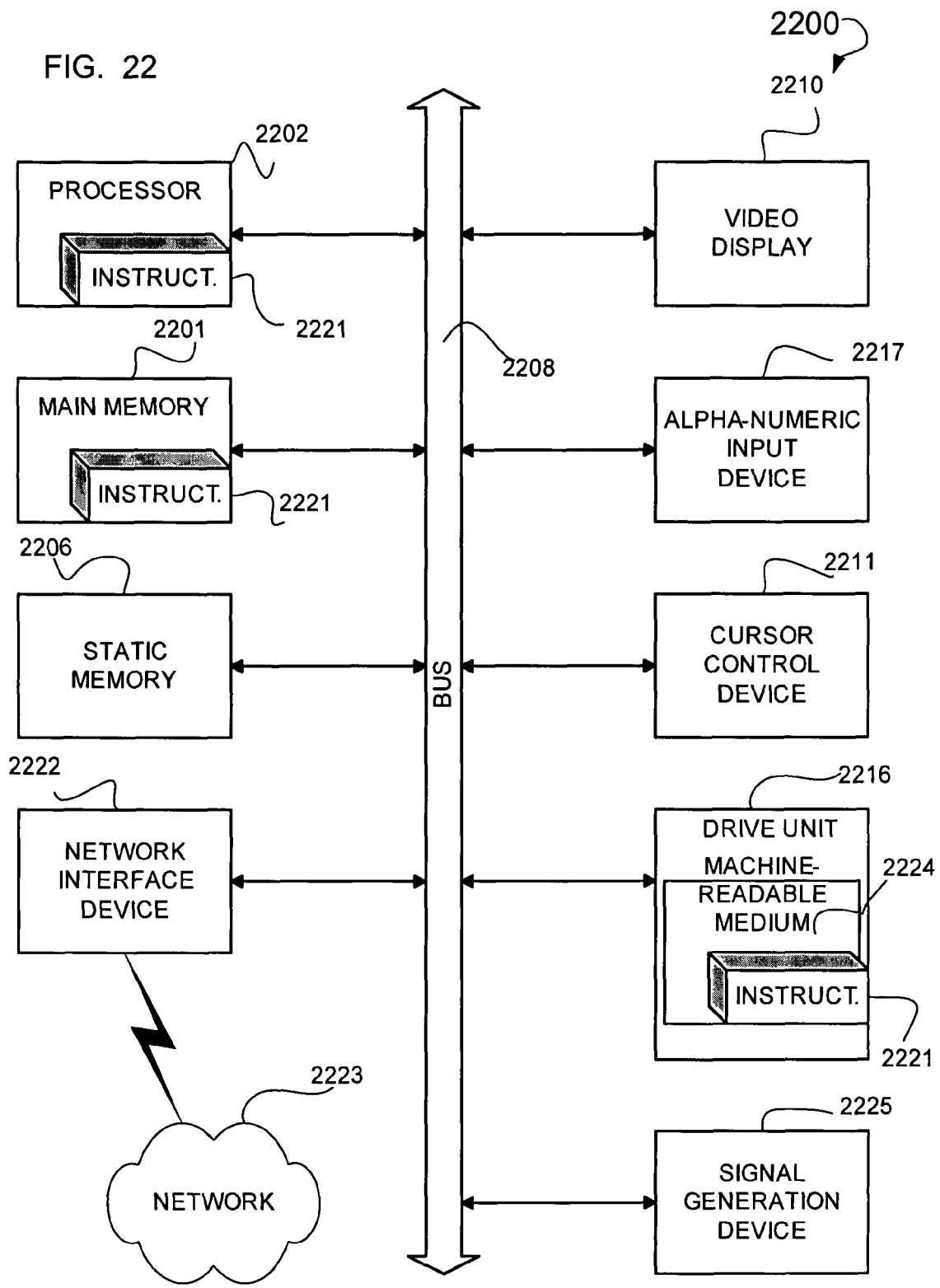
FIG. 22 shows a diagrammatic representation of a machine in the example form of a computer system, according to an example embodiment.

FIG. 22 shows a diagrammatic representation of a machine in the example form of a computer system 2200 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2200 includes a processor 2202 (e.g., a Central Processing Unit (CPU), a Graphics Processing Unit (GPU) or both), a main memory 2201, and a static memory 2206, which communicate with each other via a bus 2208. The computer system 2200 may further include a video display unit 2210 (e.g., a Liquid Crystal Display (LCD) or a Cathode Ray Tube (CRT)). The computer system 2200 also includes an alphanumeric input device 2217 (e.g., a keyboard), a User Interface (UI) cursor controller 2211 (e.g., a mouse), a disk drive unit 2216, a signal generation device 2225 (e.g., a speaker) and a network interface device (e.g., a transmitter) 2222.

The disk drive unit 2216 includes a machine-readable medium 2224 on which is stored one or more sets of instructions and data structures (e.g., software) 2221 embodying or used by any one or more of the methodologies or functions illustrated herein. The software may also reside, completely or at least partially, within the main memory 2201 and/or within the processor 2202 during execution thereof by the computer system 2200, the main memory 2201 and the processor 2202 also constituting machine-readable media.

The instructions 2221 may further be transmitted or received over a network 2223 via the network interface device 2222 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some embodiments, rather than an author having to specifically identify the particular signing server from which a user (e.g., a signing party) may obtain a key for a digital signature, in some cases this process may be fairly automated, requiring only a single action of the part of a user (e.g., a signing party and/or an author). In certain cases, the ease of executing this single action may make digital signatures more easily used to sign a variety of electronic documents.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:

1. A method comprising:
   accessing an electronic document related to content information to be signed by a signing entity,
      the electronic document including location data that indicates a location of the signing entity;
   extracting the location data of the signing entity from the accessed electronic document,
      the extracted location data identifying the signing entity,
      the extracting of the location data being performed by a processor of a machine that is communicatively coupled to the signing entity;
   transmitting identifier data of a user to the signing entity identified by the extracted location data,
      the identifier data identifying the user to the signing entity,
      the transmitting of the identifier data being based on the extracted location data of the signing entity;
   transmitting the content information related to the electronic document to the signing entity using the extracted location data of the signing entity; and
   receiving digitally signed content information related to the electronic document,
      the digitally signed content information signed by the signing entity.

2. The method of claim 1, wherein the location data is a Uniform Resource Locator (URL) value included in the electronic document.

3. The method of claim 1, wherein the identifier data of the user is generated through the use of Single Sign-On (SSO) authentication.

4. The method of claim 1, wherein the transmitted content information includes at least one of a document digest or the electronic document.

5. The method of claim 1, wherein the received digitally signed content information is the transmitted content information signed with a credential.

6. The method of claim 1, wherein the extracting of the location data is initiated with a single action of the user.

7. A method comprising:
accessing an electronic document to be signed using a credential from a signing entity,
the electronic document including location data that indicates a location of the signing entity;
extracting the location data from the accessed electronic document,
the extracted location data identifying the signing entity,
the extracting of the location data being performed by a processor of a machine that is communicatively coupled to the signing entity;
transmitting identifier data of a user to the signing entity identified by the extracted location data,
the identifier data identifying the user to the signing entity,
the transmitting of the identifier data being based on the extracted location data of the signing entity;
receiving the credential from the signing entity,
the credential being usable to sign the electronic document; and
signing the electronic document using the credential from the signing entity.

8. The method of claim 7, wherein the location data is a Uniform Resource Locator (URL) value included in the electronic document.

9. The method of claim 7, wherein the identifier data of the user is generated through the use of Single Sign-On (SSO) authentication.

10. The method of claim 7, wherein the credential is an X.509 credential.

11. The method of claim 7, wherein the extracting of the location data is initiated with a single action of the user.

12. A method comprising:
receiving identifier data of a user from a device of the user,
the receiving of the identifier data being at a signing entity identified by extracted location data included in an electronic document,
the extracted location data identifying the signing entity and indicating a location of the signing entity,
the receiving of the identifier data being based on the extracted location data being extracted from the electronic document by the device of the user,
the identifier data identifying the user to the signing entity to digitally sign content information related to the electronic document;
validating the received identifier data of the user against a credential database,
the validating of the received identifier data being performed by a processor of a machine communicatively coupled to the credential database;
receiving the content information from the device of the user,
the received content information to be digitally signed by the signing entity identified by the extracted location data included in the electronic document;
digitally signing the received content information with a credential,
the digital signing of the received content information being based on the validated identifier data of the user; and
transmitting the digitally signed content information to the device of the user.

13. The method of claim 12, wherein the identifier data of the user is generated through the use of Single Sign-On (SSO) authentication.

14. The method of claim 12, wherein the received content information includes at least one of a document digest or the electronic document.

15. The method of claim 12, wherein the extracted location data is a Uniform Resource Locator (URL) value included in the electronic document.

16. A method comprising:
receiving identifier data of a user from a device of the user,
the receiving of the identifier data being at a signing entity identified by extracted location data included in an electronic document,
the extracted location data identifying a signing entity and indicating a location of the signing entity,
the receiving of the identifier data being based on the extracted location data being extracted from the electronic document by the device of the user,
the identifier data identifying the user to the signing entity to provide a credential usable to digitally sign the electronic document;
validating the received identifier data against a credential database,
the validating of the received identifier data being performed by a processor of a machine communicatively coupled to the credential database; and
transmitting the credential to the device of the user based on the validated identifier data of the user,
the credential to be used to digitally sign the electronic document.

17. The method of claim 16, wherein the identifier data of the user is generated through the use of Single Sign-On (SSO) authentication.

18. The method of claim 16, wherein the credential is an X.509 credential.

19. A computer system comprising:
a parser to:
access an electronic document related to the content information to be signed by a signing entity,
the electronic document including location data that indicates a location of the signing entity; and
extract the location data of the signing entity from the accessed electronic document,
the extracted location data identifying the signing entity,
the parser being a module implemented using a processor of the computer system, the computer system being communicatively coupled to the signing entity;
a first transmitter to transmit identifier data of a user to the signing entity identified by the extracted location data,
the identifier data identifying a user to the signing entity,
the first transmitter to transmit the identifier data based on the extracted location data of the signing entity;
a second transmitter to transmit the content information related to the electronic document to the signing entity using the extracted location data of the signing entity; and
a receiver to receive digitally signed content information related to the electronic document,
the digitally signed content information signed by the signing entity.

20. The computer system of claim 19, wherein the location data is a Uniform Resource Locator (URL) value included in the electronic document.

21. The computer system of claim 19, wherein the identifier data of the user is generated through the use of Single Sign-On (SSO) authentication.

22. The computer system of claim 19, wherein the transmitted content information includes at least one of a document digest or the electronic document.

23. The computer system of claim 19, wherein the received digitally signed content information is the transmitted content information signed with a credential.

24. The computer system of claim 19, wherein the parser is to initiate extraction of the location data based on a single action of the user.

25. A computer system comprising:
a parser to:
 access an electronic document to be signed using a credential from a signing entity,
  the electronic document including location data that indicates a location of the signing entity; and
 extract the location data of the signing entity from the accessed electronic document,
  the extracted location data identifying the signing entity,
  the parser being a module implemented using a processor of the computer system, the computer system being communicatively coupled to the signing entity;
a transmitter to transmit identifier data of a user to the signing entity identified by the extracted location data,
 the identifier data identifying the user to the signing entity,
 the transmitter to transmit the identifier data based on the extracted location data of the signing entity;
a receiver to receive the credential from the signing entity,
 the credential being usable to sign the electronic document; and
a signing engine to sign the electronic document using the credential from the signing entity.

26. The computer system of claim 25, wherein the location data is a Uniform Resource Locator (URL) value extracted from the included in the electronic document.

27. The computer system of claim 25, wherein the identifier data of the user is generated through the use of Single Sign-On (SSO) authentication.

28. The computer system of claim 25, wherein the credential is an X.509 credential.

29. The computer system of claim 25, wherein the parser is to initiate extraction of the location data based on a single action of the user.

30. A computer system comprising:
a first receiver to receive identifier data of a user from a device of the user,
 the first receiver to receive the identifier data at a signing entity identified by extracted location data included in an electronic document,
  the extracted location data identifying the signing entity and indicating a location of the signing entity,
 the first receiver to receive the identifier data based on the extracted location data being extracted from the electronic document by the device of the user,
 the identifier data identifying the user to the signing entity to digitally sign content information related to the electronic document;
a validating engine to validate the received identifier data of the user against a credential database,
 the validating engine being a module implemented using a processor of the computer system, the computer system being communicatively coupled to the credential database;
a second receiver to receive the content information from the device of the user,
 the received content information to be digitally signed by the signing entity identified by the extracted location data included in the electronic document;
a signing engine to digitally sign the received content information with a credential,
 the signing engine to digitally sign the receive content information based on the validated identifier data of the user; and
a first transmitter to transmit the digitally signed content information to the device of the user.

31. The computer system of claim 30, wherein the identifier data is generated through the use of Single Sign-On (SSO) authentication.

32. The computer system of claim 30, wherein the received content information includes at least one of a document digest or the electronic document.

33. The computer system of claim 30, wherein the extracted location data is a Uniform Resource Locator (URL) value included in the electronic document.

34. A computer system comprising:
a receiver to receive identifier data of the user from a device of the user,
 the receiver to receive the identifier data at a signing entity identified by extracted location data included in an electronic document,
  the extracted location data identifying a signing entity and indicating a location of the signing entity,
 the receiver to receive the identifier data based on the extracted location data being extracted from the electronic document by the device of the user,
 the identifier data identifying the user to the signing entity to provide a credential usable to digitally sign the electronic document;
a validating engine to validate the received identifier data against a credential database,
 the validating engine being a module implemented using a processor of the computer system communicatively coupled to the credential database; and
a transmitter to transmit the credential to the device of the user based on the validated identifier data of the user,
 the credential to be used to digitally sign the electronic document.

35. The computer system of claim 34, wherein the identifier data of the user is generated through the use of Single Sign-On (SSO) authentication.

36. The computer system of claim 34, wherein the credential is an X.509 credential.

37. An apparatus comprising:
means for:
 accessing an electronic document related to content information to be signed by a signing entity,
  the electronic document including location data that indicates a location of the signing entity; and
 extracting the location data of the signing entity from the accessed electronic document,
  the extracted location data identifying the signing entity;
means for transmitting identifier data of a user to the signing entity identified by the extracted location data,
 the identifier data identifying the user to the signing entity, the transmitting of the identifier data being based on the extracted location data of the signing entity;

means for transmitting the content information related to electronic document to the signing entity using the extracted location data of the signing entity; and means for receiving digitally signed content information relating to the related to the electronic document, the digitally signed content information signed by the signing entity.

38. A non-transitory machine-readable medium comprising instructions that, when executed by one or more processors of a machine, cause the machine to perform operations comprising:

accessing an electronic document related to content information to be signed by a signing entity, the electronic document including location data that indicates a location of the signing entity;

extracting the location data of the signing entity from the accessed electronic document, the extracted location data identifying the signing entity;

transmitting identifier data of a user to the signing entity identified by the extracted location data, the identifier data identifying the user to the signing entity, the transmitting of the identifier data being based on the extracted location data of the signing entity;

transmitting the content information related to the electronic document to the signing entity using the extracted location data of the signing entity; and receiving digitally signed content information related to the electronic document, the digitally signed content information signed by the signing entity.

\* \* \* \* \*

UNITED STATES PATENT AND TRADEMARK OFFICE
CERTIFICATE OF CORRECTION

| | | |
|---|---|---|
| PATENT NO. | : 8,145,909 B1 | Page 1 of 1 |
| APPLICATION NO. | : 11/804069 | |
| DATED | : March 27, 2012 | |
| INVENTOR(S) | : Sunil Agrawal et al. | |

It is certified that error appears in the above-identified patent and that said Letters Patent is hereby corrected as shown below:

IN THE CLAIMS:
In column 23, line 7, in Claim 37, before "related" delete "relating to the".

Signed and Sealed this
Twenty-sixth Day of June, 2012

David J. Kappos
*Director of the United States Patent and Trademark Office*